US012236659B2

(12) United States Patent
Hibi et al.

(10) Patent No.: US 12,236,659 B2
(45) Date of Patent: Feb. 25, 2025

(54) IMAGE PROCESSING DEVICE TO DETECT AN OBJECT IN A HIGH-RESOLUTION IMAGE

(71) Applicant: Sony Group Corporation, Tokyo (JP)

(72) Inventors: Hirofumi Hibi, Kanagawa (JP); Hiroyuki Morisaki, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 216 days.

(21) Appl. No.: 17/277,878

(22) PCT Filed: Nov. 6, 2019

(86) PCT No.: PCT/JP2019/043358
§ 371 (c)(1),
(2) Date: Mar. 19, 2021

(87) PCT Pub. No.: WO2020/100664
PCT Pub. Date: May 22, 2020

(65) Prior Publication Data
US 2021/0350570 A1    Nov. 11, 2021

(30) Foreign Application Priority Data
Nov. 13, 2018    (JP) ................. 2018-213137

(51) Int. Cl.
*G06V 10/44* (2022.01)
*G06F 18/2431* (2023.01)
(Continued)

(52) U.S. Cl.
CPC .......... *G06V 10/44* (2022.01); *G06F 18/2431* (2023.01); *G06T 7/11* (2017.01);
(Continued)

(58) Field of Classification Search
CPC ...... G06V 10/44; G06V 10/764; G06V 10/82; G06V 20/52; G06V 20/64; G06V 2201/03;
(Continued)

(56) References Cited

U.S. PATENT DOCUMENTS 7,315,631 B1    1/2008 Corcoran
8,116,588 B2 *  2/2012 Choe .................... H04N 23/683
                                                382/167
(Continued)

FOREIGN PATENT DOCUMENTS

CN    108472002 A    8/2018
CN    108513711 A    9/2018
(Continued)

OTHER PUBLICATIONS

International Search Report issued on Jan. 28, 2020 in PCT/JP2019/043358 filed on Nov. 6, 2019, 2 pages.

*Primary Examiner* — Mia M Thomas
(74) *Attorney, Agent, or Firm* — Oblon, McClelland, Maier & Neustadt, L.L.P.

(57) ABSTRACT

The present disclosure relates to an image processing device, an image processing method, and a program that can reduce the amount of processing required for a series of processing from detection to recognition of an object in a high-resolution image.
An acquisition unit acquires, from a first resolution image, a second resolution image having a lower resolution than the first resolution image, a classification unit classifies an object included in the second resolution image, an identification unit identifies an object area corresponding to the object of a predetermined classification in the first resolution image, and a recognition unit performs recognition processing of the object on the object area identified in the first
(Continued)

resolution image. The technology according to the present disclosure can be applied to a camera system of a remote control tower, for example.

20 Claims, 29 Drawing Sheets

(51) Int. Cl.
*G06T 7/11* (2017.01)
*G06T 7/149* (2017.01)
*G06T 7/73* (2017.01)
*G06V 10/764* (2022.01)
*G06V 10/82* (2022.01)
*G06V 20/52* (2022.01)
*G06V 20/64* (2022.01)

(52) U.S. Cl.
CPC ............. *G06T 7/149* (2017.01); *G06T 7/73* (2017.01); *G06V 10/764* (2022.01); *G06V 10/82* (2022.01); *G06V 20/52* (2022.01); *G06V 20/64* (2022.01)

(58) Field of Classification Search
CPC ... G06V 2201/08; G06F 18/2431; G06T 7/11; G06T 7/149; G06T 7/73
See application file for complete search history.

(56) References Cited

U.S. PATENT DOCUMENTS

| | | | | |
|---|---|---|---|---|
| 8,923,556 | B2* | 12/2014 | Zhang | G06V 10/56 382/165 |
| 9,047,517 | B2* | 6/2015 | Demizu | G08B 13/19693 |
| 9,412,013 | B2* | 8/2016 | Ryu | H04N 23/56 |
| 10,052,015 | B2* | 8/2018 | Shiraishi | H04N 23/843 |
| 11,451,746 | B1* | 9/2022 | Graybill | G06T 7/11 |
| 11,842,321 | B1* | 12/2023 | Zou | G06V 20/52 |
| 11,997,378 | B2* | 5/2024 | Moon | H04N 23/633 |
| 2005/0052685 | A1* | 3/2005 | Herf | H04N 1/00214 358/1.15 |
| 2007/0230943 | A1* | 10/2007 | Chang | G03B 37/00 396/322 |
| 2008/0180520 | A1* | 7/2008 | Chang | H04N 5/77 348/E7.091 |
| 2010/0177932 | A1 | 7/2010 | Yano | |
| 2012/0328152 | A1 | 12/2012 | Bamba | |
| 2014/0002616 | A1 | 1/2014 | Ohba | |
| 2015/0036874 | A1* | 2/2015 | Gueguen | G06V 10/7625 382/103 |
| 2016/0026255 | A1* | 1/2016 | Katz | G06F 3/0304 345/156 |
| 2016/0379388 | A1* | 12/2016 | Rasco | G06Q 10/04 715/753 |
| 2017/0200063 | A1 | 7/2017 | Nariyambut Murali | |
| 2018/0070023 | A1* | 3/2018 | Oh | H04N 5/2625 |
| 2019/0147236 | A1 | 5/2019 | Hirai | |
| 2019/0370591 | A1* | 12/2019 | Chang | G06T 3/40 |
| 2020/0005098 | A1* | 1/2020 | Sung | G06V 10/454 |
| 2021/0350570 | A1* | 11/2021 | Hibi | G06T 7/73 |
| 2022/0198769 | A1* | 6/2022 | Pamuru | G06T 19/20 |
| 2022/0335726 | A1* | 10/2022 | Paverman Kashani | G06V 20/52 |
| 2023/0410352 | A1* | 12/2023 | Hassbring | G06T 3/4053 |
| 2024/0005638 | A1* | 1/2024 | Cho | G06V 10/82 |
| 2024/0013357 | A1* | 1/2024 | Yabuuchi | G06T 5/50 |

FOREIGN PATENT DOCUMENTS

| | | |
|---|---|---|
| JP | 2010-160743 A | 7/2010 |
| JP | 2011-2882 A | 1/2011 |
| JP | 2013-9050 A | 1/2013 |
| JP | 2017068747 A | 4/2017 |
| WO | WO 2017/046838 A1 | 3/2017 |
| WO | WO-2020100664 A1 * | 5/2020 ............ G06T 7/11 |

* cited by examiner

FIG. 21
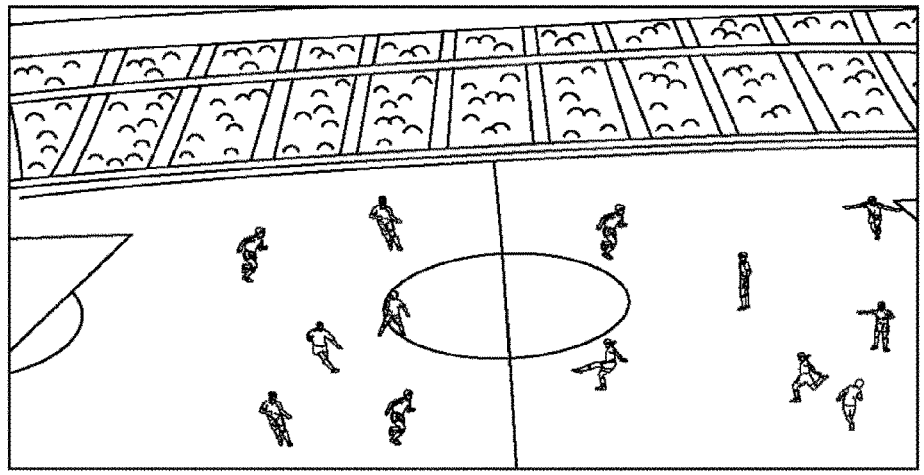
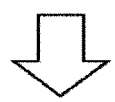 EXTRACT ONLY OBJECTS HAVING HUE OF 80 TO 120 IN HSV COLOR SPACE

IMAGE PROCESSING DEVICE TO DETECT AN OBJECT IN A HIGH-RESOLUTION IMAGE

TECHNICAL FIELD

The present disclosure relates to an image processing device, an image processing method, and a program, and in particular, to an image processing device, an image processing method, and a program that can reduce the amount of processing required for a series of processing from detection to recognition of an object in a high-resolution image.

BACKGROUND ART

Conventionally, there has been an image processing device that detects a person or an object appearing in a captured dynamic image and performs recognition processing.

For example, Patent Document 1 discloses a technology of detecting a subject area in a low-resolution image acquired from a wide-range image capturing all directions, and performing recognition processing on an area corresponding to the subject area in the wide-range image.

CITATION LIST

Patent Document

Patent Document 1: Japanese Patent Application Laid-Open No. 2013-9050

SUMMARY OF THE INVENTION

Problems to be Solved by the Invention

However, in a case where an object is recognized in a high-resolution image, the amount of processing required for a series of processing from detection to recognition of the object increases.

The present disclosure has been made in view of such a situation, and enables reduction of the amount of processing required for a series of processing from detection to recognition of an object in a high-resolution image.

Solutions to Problems

An image processing device of the present disclosure is an image processing device including: a first acquisition unit that acquires, from a first resolution image, a second resolution image having a lower resolution than the first resolution image; a classification unit that classifies an object included in the second resolution image; an identification unit that identifies an object area corresponding to the object of a predetermined classification in the first resolution image; and a recognition unit that performs recognition processing of the object on the object area identified in the first resolution image.

An image processing method of the present disclosure is an image processing method by an image processing device, the method including: acquiring, from a first resolution image, a second resolution image having a lower resolution than the first resolution image, classifying an object included in the second resolution image, identifying an object area corresponding to the object of a predetermined classification in the first resolution image, and performing recognition processing of the object on the object area identified in the first resolution image.

A program of the present disclosure is a program that causes a computer to perform processing including: acquiring, from a first resolution image, a second resolution image having a lower resolution than the first resolution image, classifying an object included in the second resolution image, identifying an object area corresponding to the object of a predetermined classification in the first resolution image, and performing recognition processing of the object on the object area identified in the first resolution image.

In the present disclosure, from a first resolution image, a second resolution image having a lower resolution than the first resolution image is acquired, an object included in the second resolution image is classified, an object area corresponding to the object of a predetermined classification is identified in the first resolution image, and recognition processing of the object is performed on the object area identified in the first resolution image.

BRIEF DESCRIPTION OF DRAWINGS

FIG. 21 is a diagram for describing color-based object extraction.

MODE FOR CARRYING OUT THE INVENTION

Hereinafter, modes for carrying out the present disclosure (hereinafter referred to as embodiments) will be described. Note that the description will be given in the following order.

1. Outline of small object detection according to present disclosure
2. Configuration and operation of image processing device
3. Processing speed
4. Modification
5. Configuration example of computer
6. Application example

1. Outline of Small Object Detection According to Present Disclosure

Figure 1:
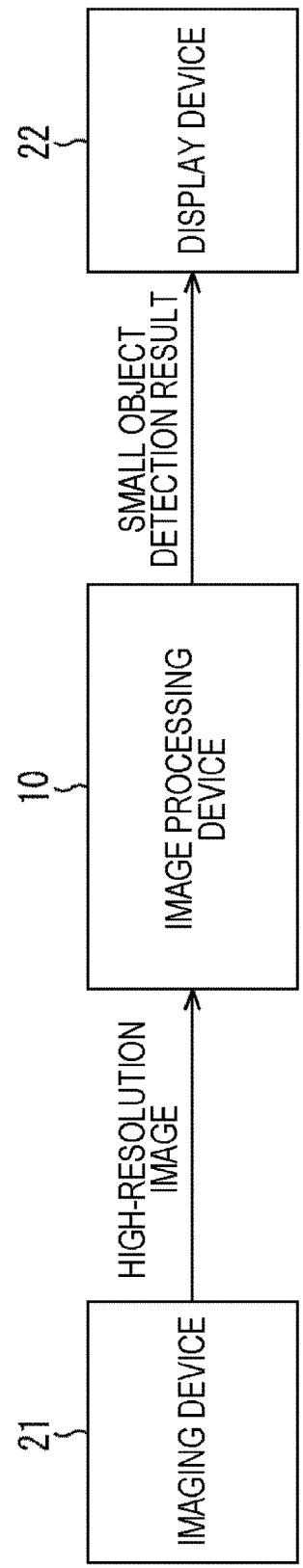
FIG. 1 is a diagram showing an image processing device to which a technology according to the present disclosure is applied.

FIG. 1 is a diagram showing an image processing device to which a technology according to the present disclosure (present technology) is applied.

An image processing device 10 of FIG. 1 acquires a high-resolution image (dynamic image) captured by an imaging device 21. The image processing device 10 detects an object (small object in particular) from the acquired high-resolution image, and outputs the detection result to a display device 22.

The imaging device 21 includes a camera equipped with a complementary metal-oxide-semiconductor (CMOS) image sensor and a charge coupled device (CCD) image sensor capable of capturing a high-resolution image.

The display device 22 includes a liquid crystal display (LCD) or an organic electro-luminescence (EL) display capable of displaying a high-resolution image. On the display device 22, the small object detection result or the like is superimposed and displayed on the high-resolution image captured by the imaging device 21. In addition to being displayed on the display device 22, the image of the present technology may be stored as image data in a storage device (not shown), for example.

A high-resolution image is, for example, an image captured by a camera installed in a remote control tower provided in an airport without a controller, or an image obtained by a remote monitoring device that monitors a building, a factory, a store, a town, or the like in a remote location. The resolution of a high-resolution image is 4K resolution, for example.

Figure 2:
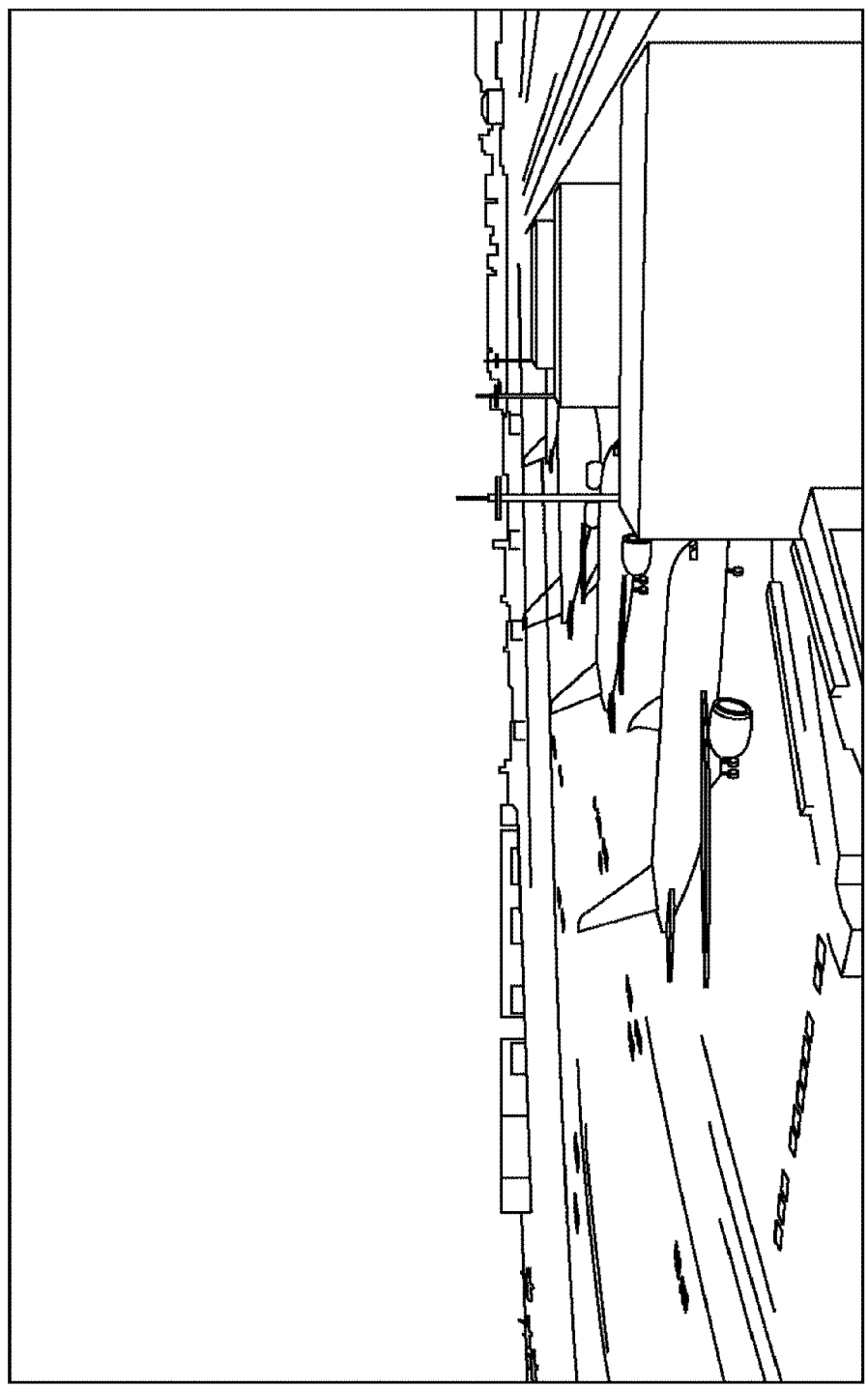
FIG. 2 is a diagram showing an example of a high-resolution image.

FIG. 2 is a diagram showing an example of a high-resolution image. The high-resolution image shown in FIG. 2 is an image captured by a camera installed in a remote control tower, and shows multiple aircraft parked in an apron of an airport. Moreover, although not shown, the high-resolution image of FIG. 2 also shows multiple aircraft flying over the airport.

Conventionally, in a case of recognizing a small object such as an aircraft flying in a distant place in a high-resolution image with 4K resolution, the amount of processing required for a series of processing from detection to recognition of the small object increases. Specifically, even in a case where an existing object detection method is used with a high-performance graphics processing unit (GPU), an amount of processing that takes several seconds to a dozen seconds is required to detect a small object in a high-resolution image with 4K resolution.

On the other hand, in a low-resolution image obtained by reducing a high-resolution image, the recognition accuracy of a small object is lowered because the resolution is low.

Figure 3:
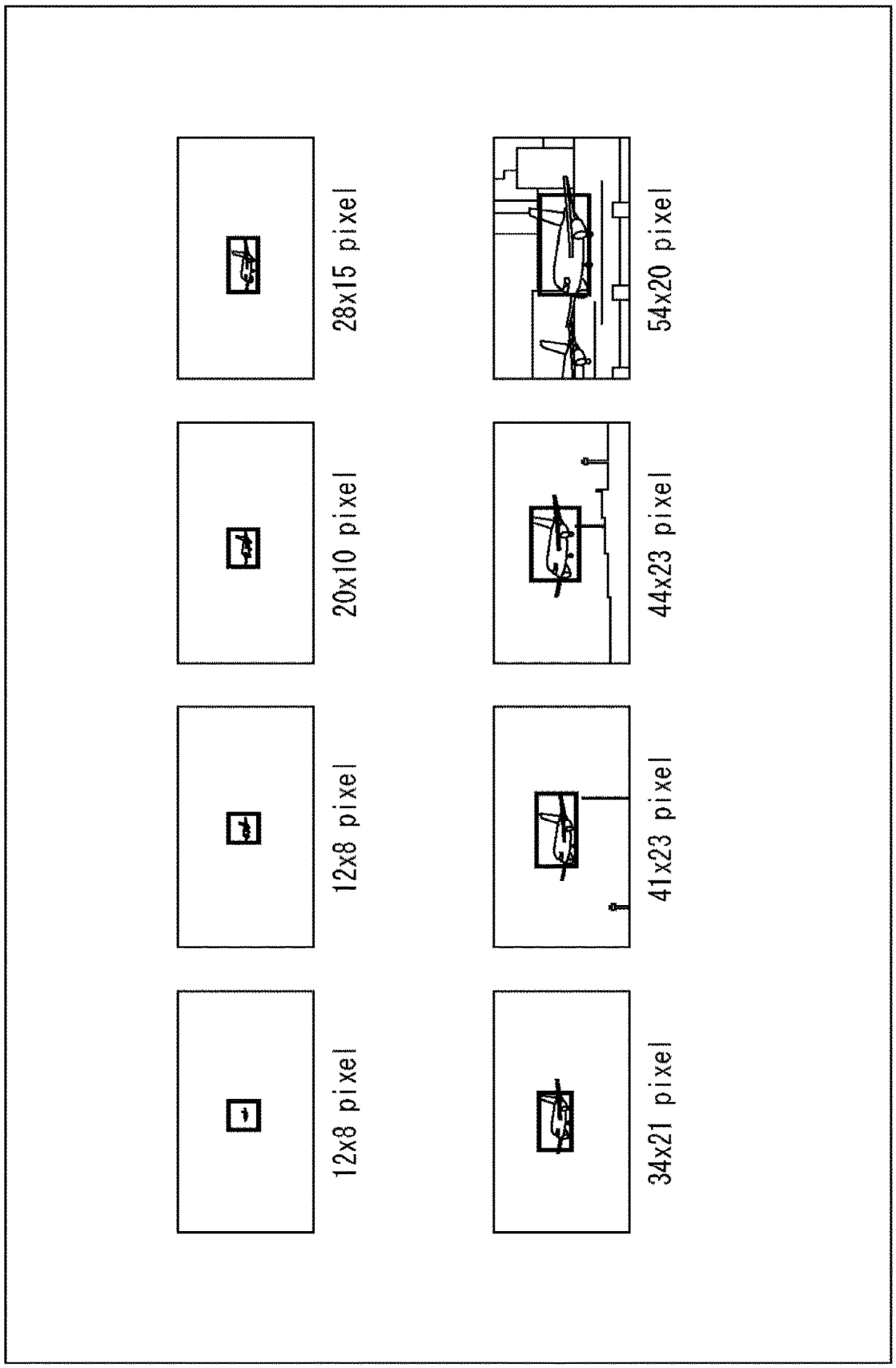
FIG. 3 is a diagram showing an example of a small object detected by the technology according to the present disclosure.

Hence, the image processing device to which the present technology is applied achieves reduction in the amount of processing required for a series of processing from detection to recognition of a small object in a high-resolution image. Specifically, the technology according to the present disclosure achieves reduction in the amount of processing required for detection to recognition of a small object with pixel sizes of 12×8, 20×10, 28×15, 34×21, 41×23, 44×23, and 54×20 as shown in FIG. 3, in a high-resolution image with 4K resolution.

2. Configuration and Operation of Image Processing Device

The configuration and operation of the image processing device 10 to which the present technology is applied will be described below.

(Configuration of Image Processing Device)

Figure 4:
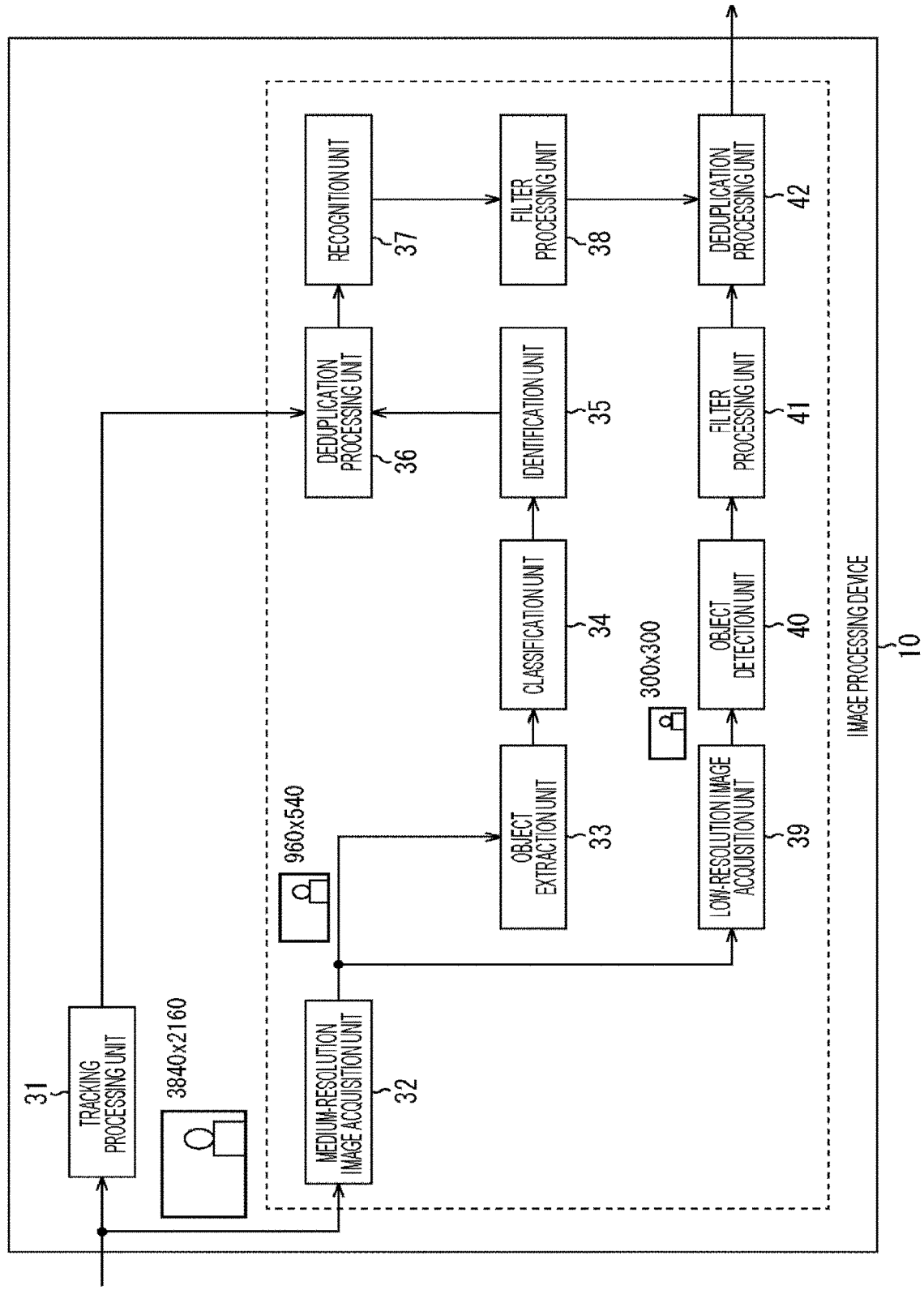
FIG. 4 is a block diagram showing a functional configuration example of the image processing device.

FIG. 4 is a block diagram showing a functional configuration example of the image processing device 10.

The image processing device 10 of FIG. 4 includes a tracking processing unit 31, a medium-resolution image acquisition unit 32, an object extraction unit 33, a classification unit 34, an identification unit 35, a deduplication processing unit 36, a recognition unit 37, and a filter processing unit 38. The image processing device 10 further includes a low-resolution image acquisition unit 39, an object detection unit 40, a filter processing unit 41, and a deduplication processing unit 42.

The tracking processing unit 31 tracks an object recognized by the recognition unit 37, which will be described later, in a high-resolution image of 3840×2160 pixels, for example, supplied from the imaging device 21. The object to be tracked is a small object having a pixel size as described above. The tracking processing unit 31 corrects the position of the object being tracked every predetermined frame such as every three frames. Information indicating an area of the object being tracked on the high-resolution image (hereinafter referred to as object area) is supplied to the deduplication processing unit 36. The information indicating an object area includes information indicating the size and position (coordinate position on image) of the moving object.

The medium-resolution image acquisition unit 32 acquires a medium-resolution image having a lower resolution than the high-resolution image such as 960×540 pixels every predetermined frame such as every 15 frames from the high-resolution image supplied from the imaging device 21. Specifically, the medium-resolution image acquisition unit 32 has a resolution conversion function for converting the resolution of an image, and performs down-conversion processing such as thinning processing on the high-resolution image to acquire a medium-resolution image. The acquired medium-resolution image is supplied to the object extraction unit 33 and the low-resolution image acquisition unit 39. Note that the high-resolution image supplied from the imaging device 21 may be supplied as it is to the low-resolution image acquisition unit 39.

Note that in the image processing device 10 of FIG. 4, the functional blocks surrounded by the broken line repeat each processing every 15 frames as in the medium-resolution image acquisition unit 32.

The object extraction unit 33 extracts a predetermined object in the medium-resolution image from the medium-resolution image acquisition unit 32. Here, while it is assumed that a moving object is extracted in the medium-resolution image, a still object may be extracted depending on the extraction method. The extracted moving objects include objects that are not to be tracked, as well as small objects to be tracked. The object extraction unit 33 supplies information indicating the extracted moving object to the classification unit 34. The information indicating the moving object includes information indicating the size and coordinate position of the moving object.

The classification unit 34 classifies moving objects included in the medium-resolution image under predetermined conditions on the basis of the information from the object extraction unit 33. The classification unit 34 supplies information indicating the classified moving object to the identification unit 35.

The identification unit 35 identifies an object area corresponding to a moving object of a predetermined classification in a high-resolution image on the basis of the information from the classification unit 34. Information indicating the object area (object size and coordinate position) is supplied to the deduplication processing unit 36.

The deduplication processing unit 36 eliminates duplication in the area of the object tracked by the tracking processing unit 31 and the object area identified by the identification unit 35 in the high-resolution image, on the basis of the information from the tracking processing unit 31 and the information from the identification unit 35. Information indicating an object area in which duplication is eliminated in the high-resolution image is supplied to the recognition unit 37.

The recognition unit 37 performs moving object recognition processing on the object area in the high-resolution image on the basis of the information from the deduplication processing unit 36. Specifically, the recognition unit 37 performs moving object recognition processing by performing image classification by machine learning using teacher data. The recognition unit 37 supplies the filter processing unit 38 with a certainty level representing the certainty that the moving object in the object area is a small object to be recognized.

The filter processing unit 38 performs time series filter processing to judge the certainty level from the recognition unit 37 in time series and determine the certainty level. Information indicating a moving object whose determined certainty level is greater than a certain value, for example, is supplied to the deduplication processing unit 42 as a small object detection result.

The low-resolution image acquisition unit 39 acquires a low-resolution image having a lower resolution than the medium-resolution image such as 300×300 pixels, from the medium-resolution image from the medium-resolution image acquisition unit 32. Specifically, the low-resolution image acquisition unit 39 has a resolution conversion function for converting the resolution of an image, and performs down-conversion processing such as thinning processing on the medium-resolution image to acquire a low-resolution image. The acquired low-resolution image is supplied to the object detection unit 40. Note that in a case where the high-resolution image from the imaging device 21 is supplied as it is from the medium-resolution image acquisition unit 32, the low-resolution image acquisition unit 39 can perform down-conversion processing on the high-resolution image to acquire a low-resolution image.

The object detection unit 40 performs an object detection unit on the low-resolution image from the low-resolution image acquisition unit 39. The object detection result is supplied to the filter processing unit 41.

The filter processing unit 41 performs time series filter processing to judge the object detection result from the object detection unit 40 in time series and determine the object detection result. The determined object detection result is supplied to the deduplication processing unit 42.

The deduplication processing unit 42 eliminates duplication in the moving object (small object) recognized in the high-resolution image and the object detected by the object detection unit 40 on the basis of the small object detection result from the filter processing unit 38 and the object detection result from the object detection unit 40. Information indicating an object area in which duplication is eliminated in the high-resolution image is output as the final small object detection result.

(Operation of Image Processing Device)

Figure 5:
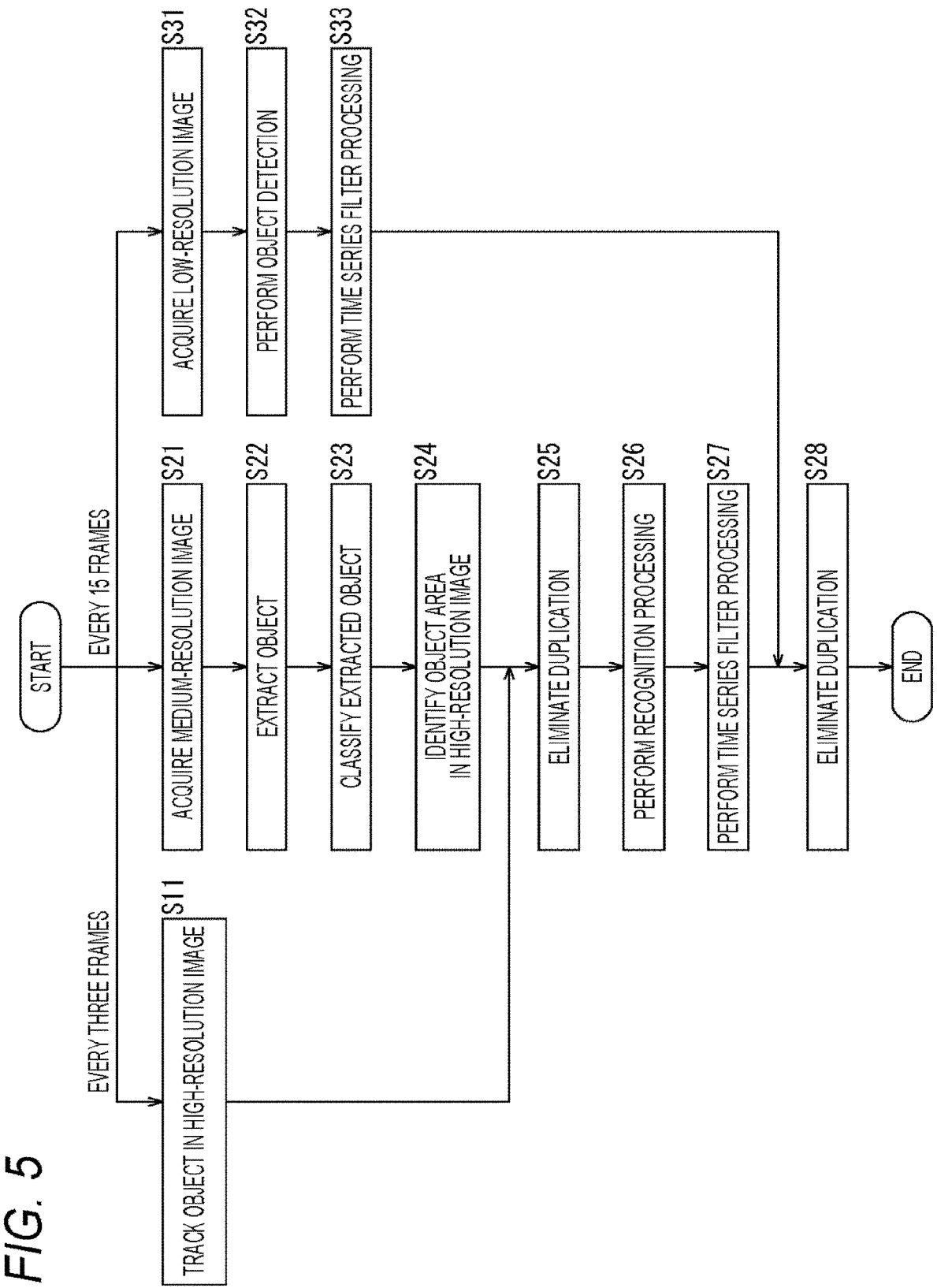
FIG. 5 is a flowchart illustrating a flow of small object detection processing.

Next, the flow of small object detection processing by the image processing device 10 will be described with reference to the flowchart of FIG. 5. In the processing of FIG. 5, the processing of step S11 is performed every three frames, and the processing of steps S21 to S28 and the processing of steps S31 to S33 are performed every 15 frames.

In step S11, the tracking processing unit 31 tracks a moving object (small object) in a high-resolution image. The processing of step S11 is performed after the processing of steps S21 to S28 and S31 to S33 is once performed by the image processing device 10 for a predetermined frame of the high-resolution image.

Area-based object tracking methods such as template matching and feature point-based object tracking methods such as the KLT method are used for tracking a moving object. For example, for tracking a moving object, an object tracking method using kernelized correlation filter (KCF) in which an object template is learned whenever necessary while tracking an object can be used. An image frame as described later is set for the moving object tracked in the high-resolution image, and an area for which the image frame is set is cut out from the high-resolution image.

Meanwhile, in step S21, the medium-resolution image acquisition unit 32 acquires a resolution image from the high-resolution image.

In step S22, the object extraction unit 33 extracts a moving object from the medium-resolution image acquired by the medium-resolution image acquisition unit 32.

In step S23, the classification unit 34 classifies the moving object extracted from the medium-resolution image by the object extraction unit 33.

Figure 6:
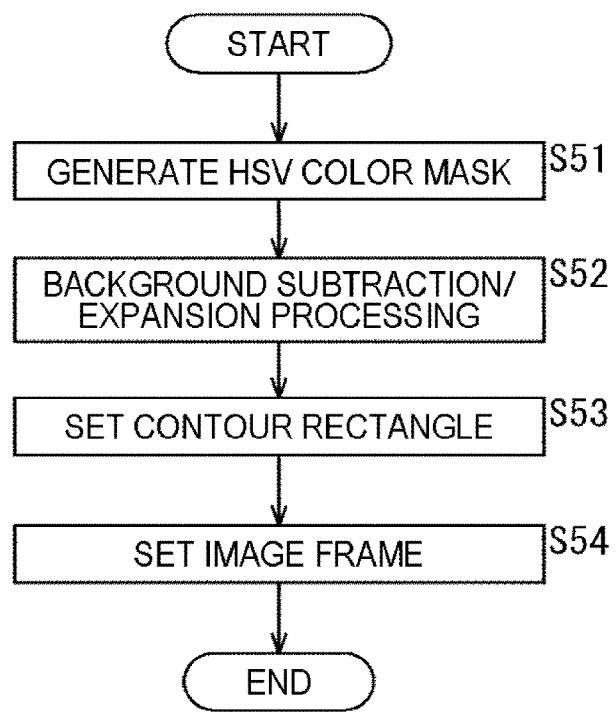
FIG. 6 is a flowchart illustrating details of extraction and classification of objects.

Here, details of the extraction and classification of the moving object in steps S22 and S23 will be described with reference to the flowchart of FIG. 6.

In step S51, an HSV color mask image is generated on the basis of the medium-resolution image. According to the HSV color mask image, a specific color region can be extracted from the medium-resolution image by specifying the values of H (hue), S (saturation), and V (brightness).

Figure 7:
FIG. 7 is a diagram showing an example of an image obtained by generating an HSV color mask.

FIG. 7 is an example of an HSV color mask image generated on the basis of the medium-resolution image obtained from the high-resolution image of FIG. 2. The HSV color mask image shown in FIG. 7 is a mask image that extracts the color of the sky from the medium-resolution image. Here, not only the mask image for extracting the color of the sky but also a mask image for extracting the color of the paved surface of the apron or the runway, for example, may be generated.

In step S52, background subtraction/expansion processing is performed on the area where the color is extracted by the HSV color mask image in the medium-resolution image. In background subtraction, a moving object is extracted from the medium-resolution image by comparing the previous frame with the current frame. Additionally, in expansion processing, the pixel area of the moving object extracted by background subtraction can be expanded.

Figure 8:
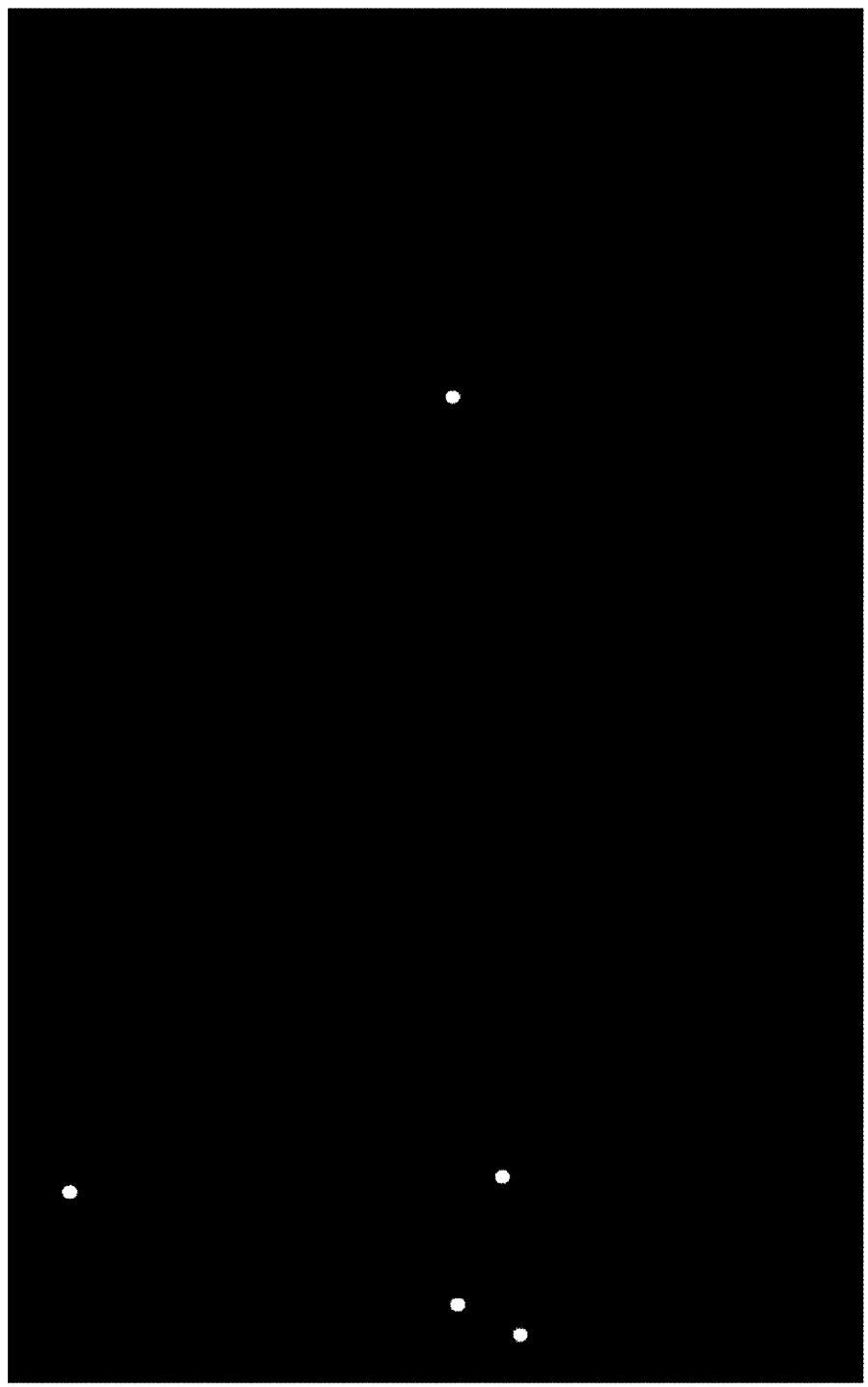
FIG. 8 is a diagram showing an example of a processed image obtained by background subtraction/expansion processing.

FIG. 8 is a diagram showing an example of a processed image obtained by performing background subtraction/expansion processing on an area where the color is extracted by the HSV color mask image of FIG. 7 in a medium-resolution image.

In the processed image of FIG. 8, multiple (specifically, five) moving objects existing in the sky area in the medium-resolution image are shown as a set of white pixels. These moving objects include not only aircraft to be tracked but also objects that are not to be tracked.

Figure 9:
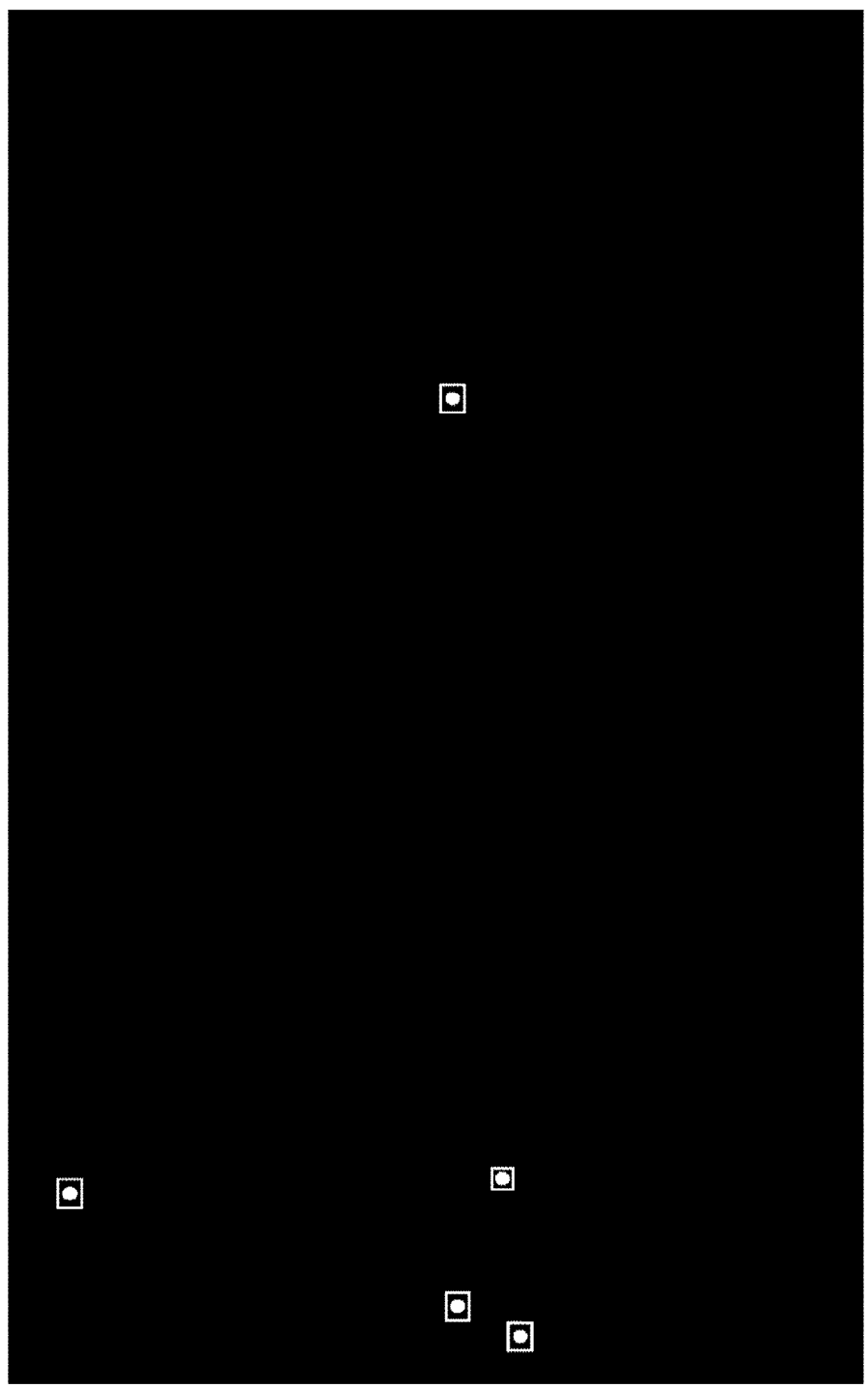
FIG. 9 is a diagram for describing setting of contour rectangles.

In step S53, as shown in FIG. 9, a contour rectangle in which the contour of the extracted moving object fits is set. In FIG. 9, a contour rectangle is shown for each of the five moving objects described with reference to FIG. 8.

Figure 10:
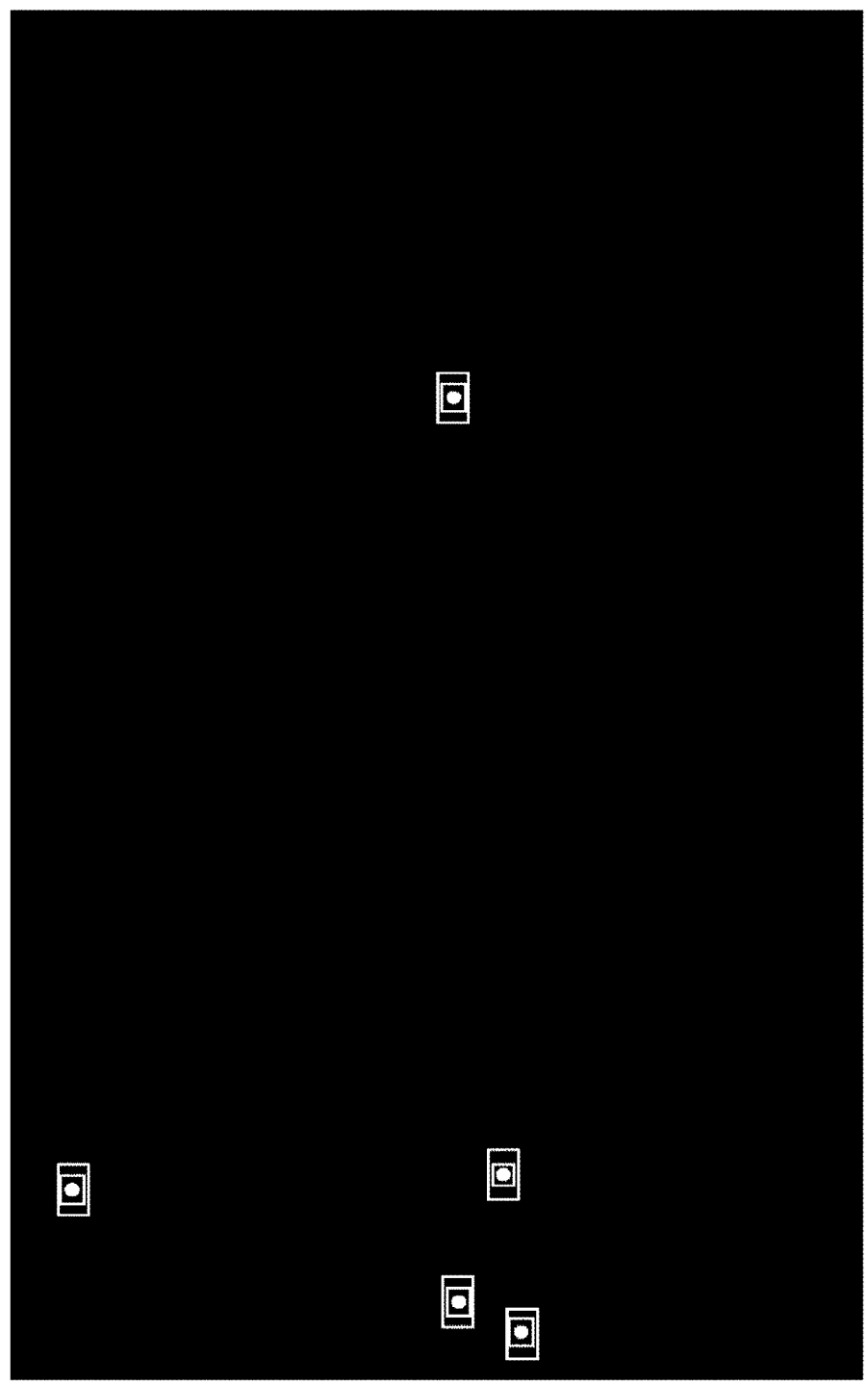
FIG. 10 is a diagram for describing setting of image frames.

In step S54, as shown in FIG. 10, an image frame is set for the moving object for which the contour rectangle is set. The image frame is information for identifying an object area including a tracking target in a high-resolution image. In the example of FIG. 10, an image frame is set for each of the five moving objects for which the contour rectangles are extracted as described with reference to FIG. 9.

The size of the image frame is smaller than a predetermined size, and multiple image frames of different sizes are prepared. The size of the set image frame is switched according to the size of the contour rectangle set for the moving object. The predetermined size is the upper limit of the size of the image frame in which the moving object can be detected as a small object. As a result, a moving object that does not exceed a certain size is detected as a small object, and a moving object that exceeds a certain size is detected as a large object described later.

Figure 11:
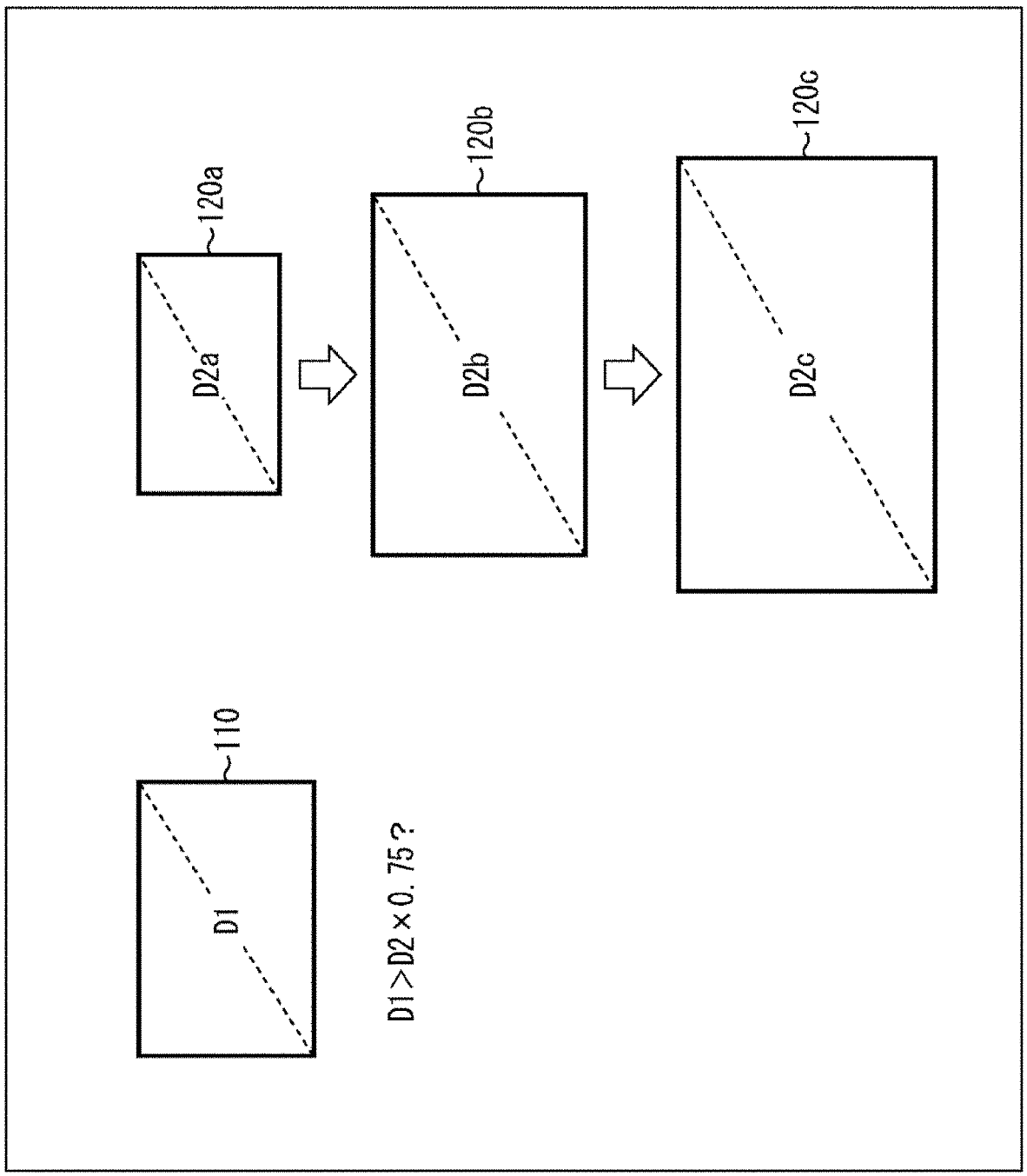
FIG. 11 is a diagram for describing switching of the image frame according to the contour rectangle.

FIG. 11 is a diagram for describing switching of the image frame according to the contour rectangle.

In the upper left of FIG. 11, a contour rectangle 110 set for a predetermined moving object is shown. On the right side of FIG. 11, multiple (specifically, three) image frames 120a, 120b, and 120c having different sizes are shown.

For example, the size of the image frame 120a is 16×8 pixels corresponding to 128×64 pixels of a high-resolution image, and the size of the image frame 120b is 32×16 pixels corresponding to 256×128 pixels of a high-resolution image. Additionally, the size of the image frame 120c is 64×32 pixels corresponding to 512×256 pixels of a high-resolution image.

When an image frame is set for a moving object, the length of a diagonal line D1 of the contour rectangle 110 and the length of a diagonal line D2 (D2a, D2b, D2c) of the image frame 120 (120a, 120b, 120c) are compared in order from the image frame having the smallest size. Specifically, every time the length of the diagonal line D1 of the contour rectangle 110 exceeds 75% (D2×0.75) of the length of the diagonal line D2 of the image frame 120, comparison with the length of the diagonal line D2 of the image frame 120 of the next size up is repeated. Then, when the length of the diagonal line D1 of the contour rectangle 110 is less than 75% of the length of the diagonal line D2 of the image frame 120, that image frame 120 is set for the moving object.

That is, by setting the image frame, the extracted moving object is classified on the basis of its size.

Note that the size of the image frame to be set may be limited by the area where the extracted moving object exists. For example, only a 16×8 pixel image frame is set for a moving object existing in the sky area where an aircraft appears smaller. Additionally, a 32×16 pixel or 64×32 pixel image frame is set for a moving object existing in the area of the paved surface where an aircraft looks larger than in the sky area.

Additionally, a coordinate position on the medium-resolution image is set for the moving object classified on the basis of its size at the time when the moving object is extracted. The coordinate position of the moving object set on the medium-resolution image is the center of the contour rectangle set for the moving object, for example.

When the moving object is classified on the basis of its size in this way, the processing proceeds to step S24 in FIG. 5.

In step S24, the identification unit 35 identifies an object area corresponding to each moving object classified on the basis of its size in a high-resolution image.

Specifically, the identification unit 35 identifies the object area by converting the image frame set for each moving object in the medium-resolution image into coordinates on a high-resolution image.

For example, suppose that a 16×8 pixel image frame is set for a moving object (contour rectangle) having a size of 5×5 pixels centered on a coordinate position (100, 50) on a medium-resolution image. In this case, the 16×8 pixel image frame centered on the coordinate position (100, 50) is transformed into a 128×64 pixel image frame centered on the coordinate position (400, 200) on the high-resolution image, and the area of the image frame after coordinate transformation becomes the object area.

Here, the identified object area (area of image frame after coordinate transformation) is cut out from the high-resolution image.

In step S25, the deduplication processing unit 36 eliminates duplication in the area of the moving object tracked by the tracking processing unit 31 and the object area identified by the identification unit 35 in the high-resolution image. Here, by using intersection over union (IoU), the duplication in the tracked moving object area and the identified object area is eliminated.

Figure 12:
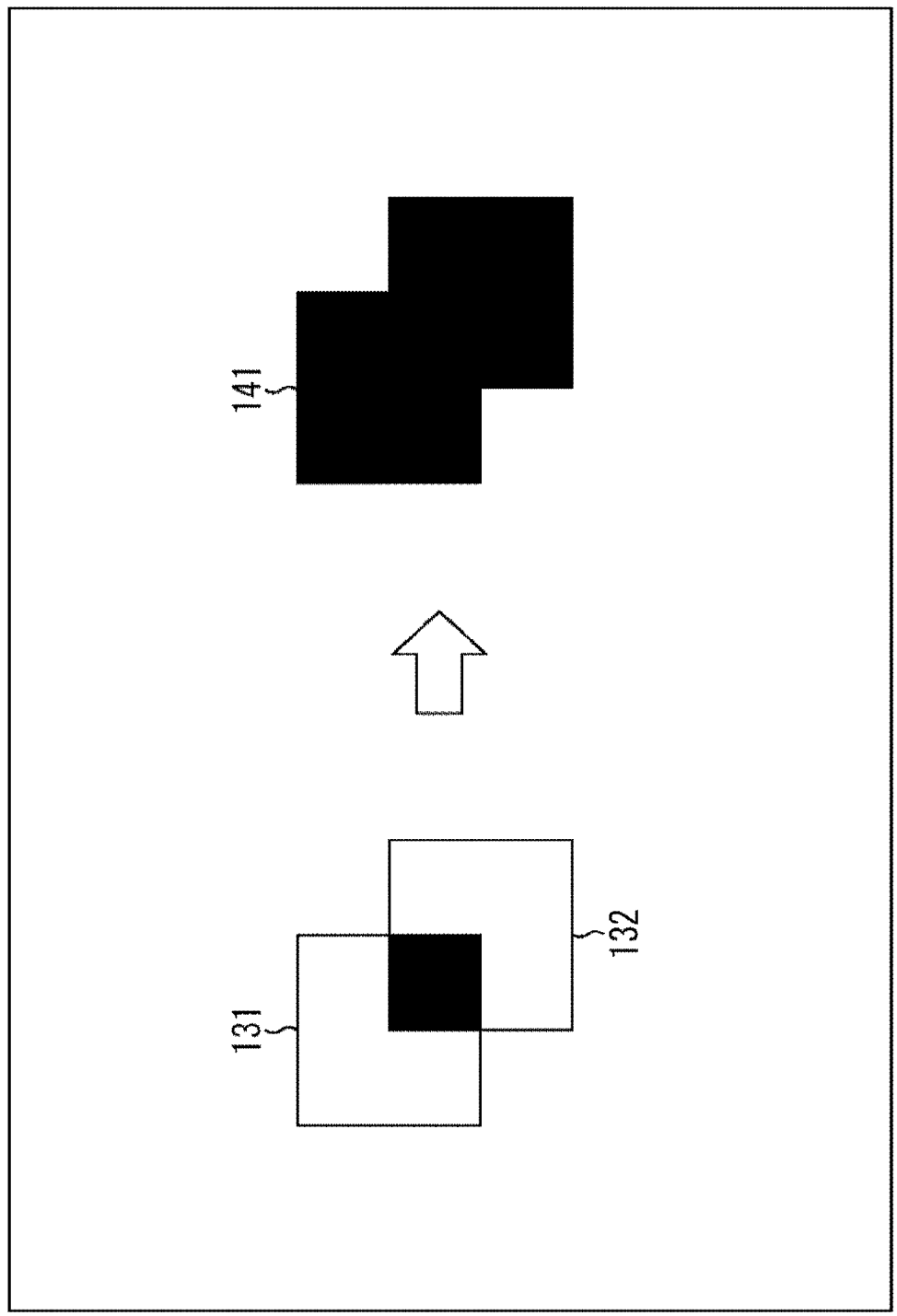
FIG. 12 is a diagram for describing elimination of duplication.

According to IoU, as shown in FIG. 12, in a case where the percentage of an area where an object area 131 and an object area 132 overlap in the total area of the object area 131 and the object area 132 exceeds a predetermined threshold (e.g., 0.5), it is determined that the object area 131 and the object area 132 overlap. In this case, the object area 131 and the object area 132 are determined to be the same object area 141.

When the duplication in the tracked moving object area and the identified object area is eliminated in this way, the processing proceeds to step S26.

In step S26, the recognition unit 37 performs moving object recognition processing on the object area in which duplication with the tracked moving object area is eliminated in the high-resolution image.

At this time, the recognition unit 37 normalizes the size of the identified object area on the basis of the pixel size of teacher data which is an image of a predetermined object used in the moving object recognition processing. Specifically, the sizes of object areas are all normalized to the size of 128×64 pixels. As a result, recognition processing is simultaneously performed for 64 object areas.

The recognition unit 37 determines whether or not a moving object in the object area is like an aircraft by performing binary classification on the object area using a learning model learned in advance from the teacher data. As a result, a certainty level indicating the certainty that the moving object in the object area is a small object (aircraft) to be recognized is calculated.

In step S27, the filter processing unit 38 performs time series filter processing to judge the certainty level calculated by the recognition unit 37 in time series and determine the certainty level. Here, for example, information indicating three moving objects with the highest magnitude of the determined certainty level is taken as the small object (aircraft) detection result.

Here, the processing of steps S31 to S33 will be described before the processing of step S28 is described.

In step S31, the low-resolution image acquisition unit 39 acquires a low-resolution image from the medium-resolution image from the medium-resolution image acquisition unit 32.

In step S32, the object detection unit 40 performs object detection on the low-resolution image acquired by the low-resolution image acquisition unit 39. Here, since the object detection is performed on a low-resolution image, the detection target is not a small object such as the small object described above, but a relatively large object (large object).

In step S33, the filter processing unit 41 performs time series filter processing to judge the object detection result from the object detection unit 40 in time series and determine the object detection result.

Then, in step S28, the deduplication processing unit 42 eliminates duplication in the moving object (small object) recognized in the high-resolution image and the large object detected in the low-resolution image. Again, by using IoU, the duplication in the recognized moving object area and the detected large object area is eliminated.

In this way, the final small object detection result is output.

Figure 13:
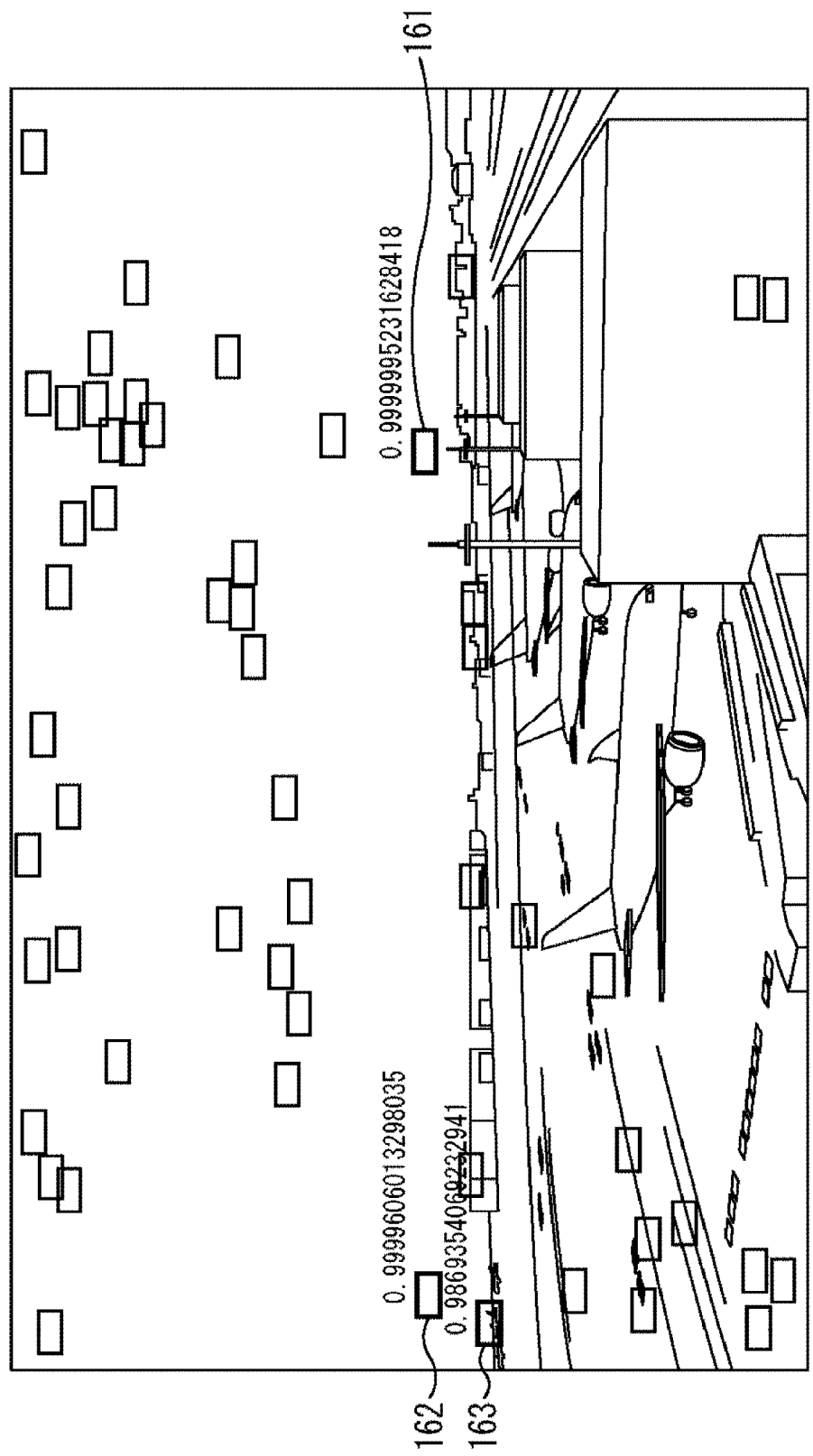
FIG. 13 is a diagram showing an example of a small object detection result.

FIG. 13 is a diagram showing an example of a small object detection result.

In FIG. 13, the extraction result of moving objects and the detection result of the extracted moving objects determined to be aircraft are superimposed and shown on the high-resolution image of FIG. 2.

In FIG. 13, image frames 161, 162, and 163 show the detection result of aircraft, and the other image frames show the extraction result of moving objects other than the aircraft. The value of the certainty level is shown in the vicinity of the image frames 161, 162, and 163. That is, it can be said that the moving object identified by the image frame 161 is most likely to be an aircraft.

According to the above processing, in the medium-resolution image acquired from the high-resolution image, a moving object smaller than a predetermined size is classified, and an area corresponding to the classified moving object is identified as a recognition target candidate on the high-resolution image. With this configuration, it possible to reduce the amount of processing required for a series of processing from detection to recognition of an object (small object in particular) in a high-resolution image. As a result, it is possible to track small objects in real time in images with high resolution such as 4K resolution.

In particular, since the moving object is classified on the basis of its size by setting the image frame, it is possible to recognize/track smaller objects than before, and it is possible to improve the recognition accuracy.

3. Processing Speed

Figure 14:
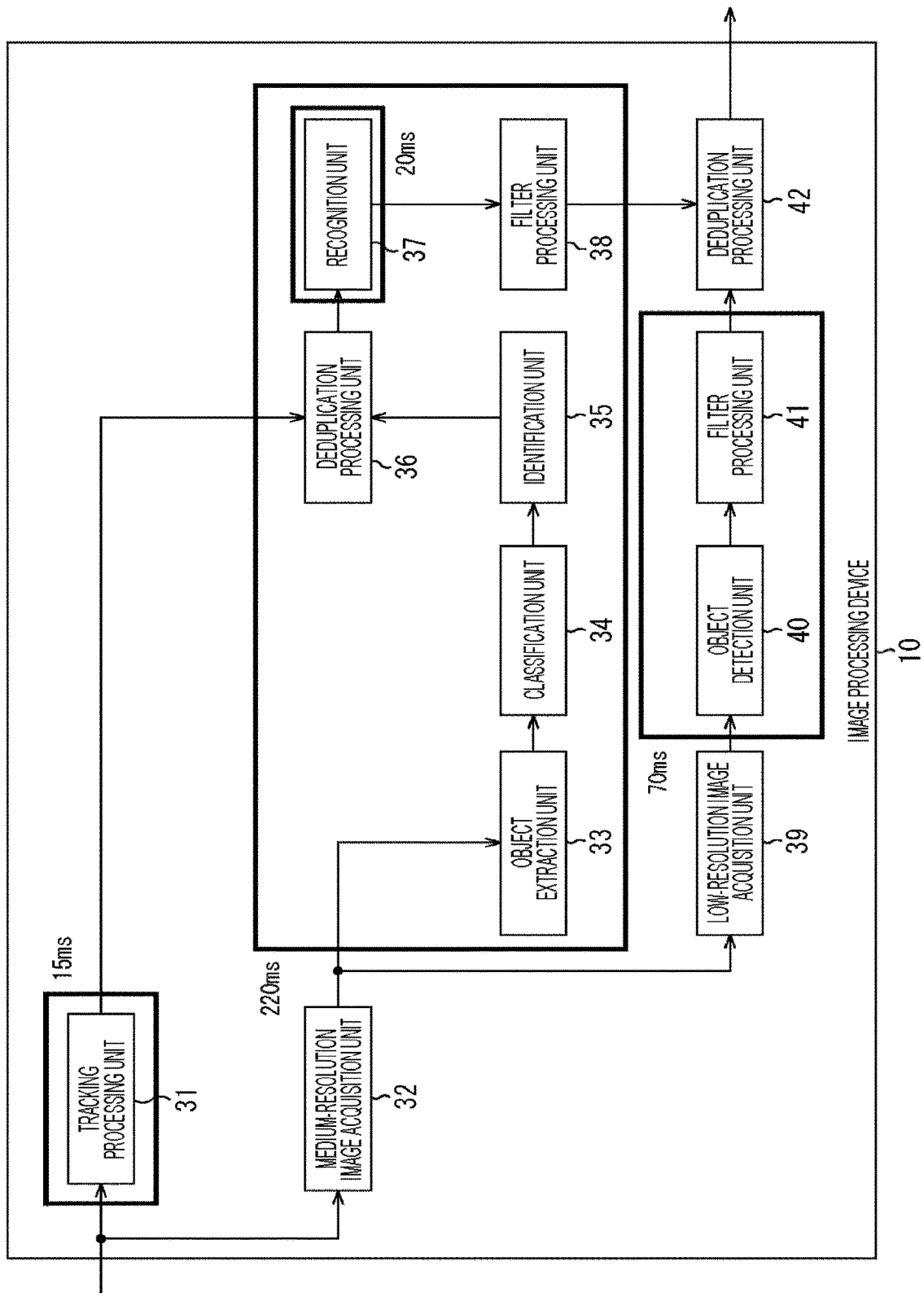
FIG. 14 is a diagram for describing the processing speed of the image processing device.

Here, the processing speed of the image processing device 10 of the present technology will be described with reference to FIG. 14. The image processing device 10 is designed so that the time required for the processing performed in each block surrounded by the thick frame in FIG. 14 is as follows.

The recognition processing by the recognition unit 37 is performed for 64 object areas having a size of 128×64 pixels, and the processing time is 20 ms.

The processing time of the tracking processing by the tracking processing unit 31 performed every three frames is 15 ms per object. Accordingly, the processing time of the tracking processing per 30 frames is 150 ms×the number of objects.

Of the processing performed every 15 frames, the processing time of the small object detection processing by the object extraction unit 33 to the filter processing unit 38 is 220 ms in a case of detecting a small object of 12×8 pixels. Additionally, the processing time of the large object detection processing by the object detection unit 40 and the filter processing unit 41 is 70 ms.

In a case where the small object detection processing and the large object detection processing are performed serially, the processing time of the processing performed every 15 frames is 290 ms. Accordingly, the processing time for the small object detection processing and the large object detection processing per 30 frames is 580 ms.

That is, the above-mentioned series of processing takes a total time of 150 ms×the number of objects and 580 ms per 30 frames. Here, assuming that the number of frames is usually 30 frames per second, if the number of small objects is three, the time required for a series of processing can be reduced to about one second. Additionally, in a case where the above-described series of processing is executed in parallel, the time required for the series of processing can be reduced to about one second even when recognizing more objects.

4. Modification

Hereinafter, modifications of the above-described embodiment will be described.
(Modification 1)

Figure 15:
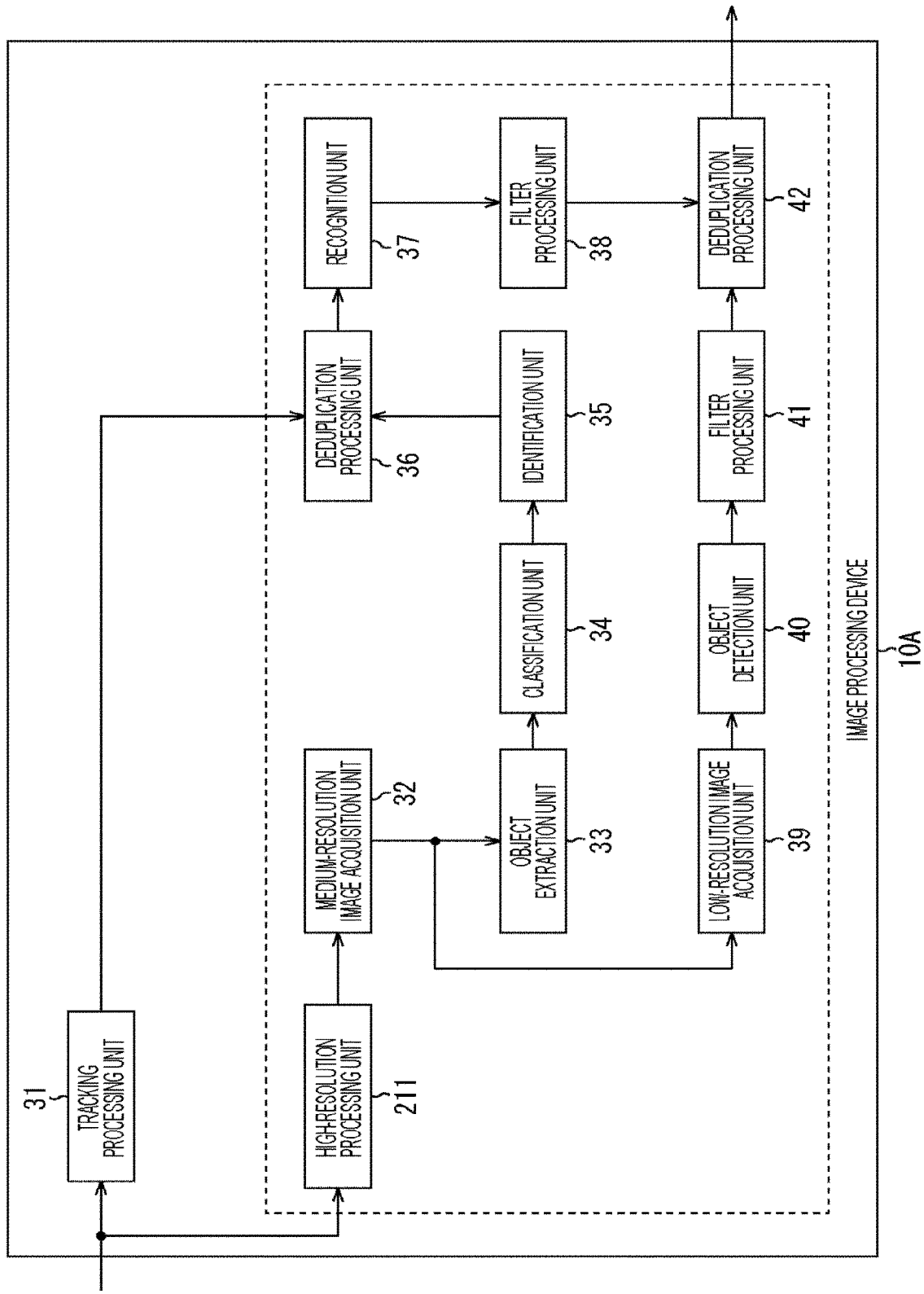
FIG. 15 is a block diagram showing another functional configuration example of the image processing device.

FIG. 15 is a block diagram showing a functional configuration example of an image processing device 10A, which is a first modification of the image processing device 10.

The image processing device 10A of FIG. 15 is different from the image processing device 10 of FIG. 1 in that a high-resolution processing unit 211 is provided prior to a medium-resolution image acquisition unit 32.

The high-resolution processing unit 211 performs high-resolution processing such as edge enhancement on the high-resolution image supplied from an imaging device 21, and supplies the high-resolution image to the medium-resolution image acquisition unit 32.

With such a configuration, since an object extraction unit 33 is supplied with a medium-resolution image in which the edges of an object are emphasized, the object extraction performance by the object extraction unit 33 can be improved.

(Modification 2)

Figure 16:
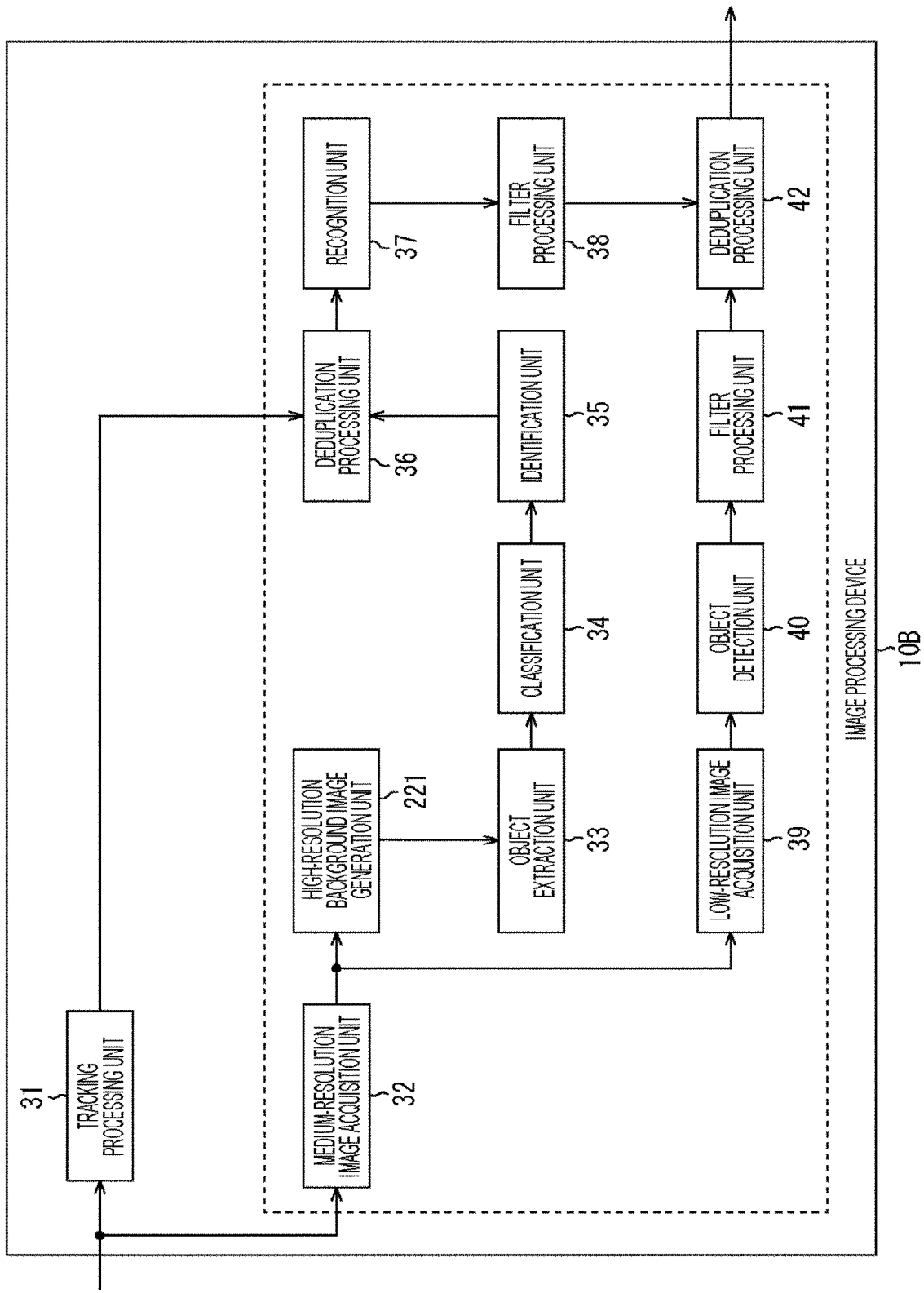
FIG. 16 is a block diagram showing yet another functional configuration example of the image processing device.

FIG. 16 is a block diagram showing a functional configuration example of an image processing device 10B, which is a second modification of the image processing device 10.

The image processing device 10B of FIG. 16 is different from the image processing device 10 of FIG. 1 in that a high-resolution background image generation unit 221 is provided prior to an object extraction unit 33.

The high-resolution background image generation unit 221 generates a high-resolution background image by enlarging (increasing the resolution) the background portion in a medium-resolution image from a medium-resolution image acquisition unit 32. The generated high-resolution background image is supplied to the object extraction unit 33.

In the object extraction unit 33, a moving object is extracted on the high-resolution background image by background subtraction.

With such a configuration, it is possible to improve the extraction accuracy of smaller moving objects.

(Modification 3)

Figure 17:
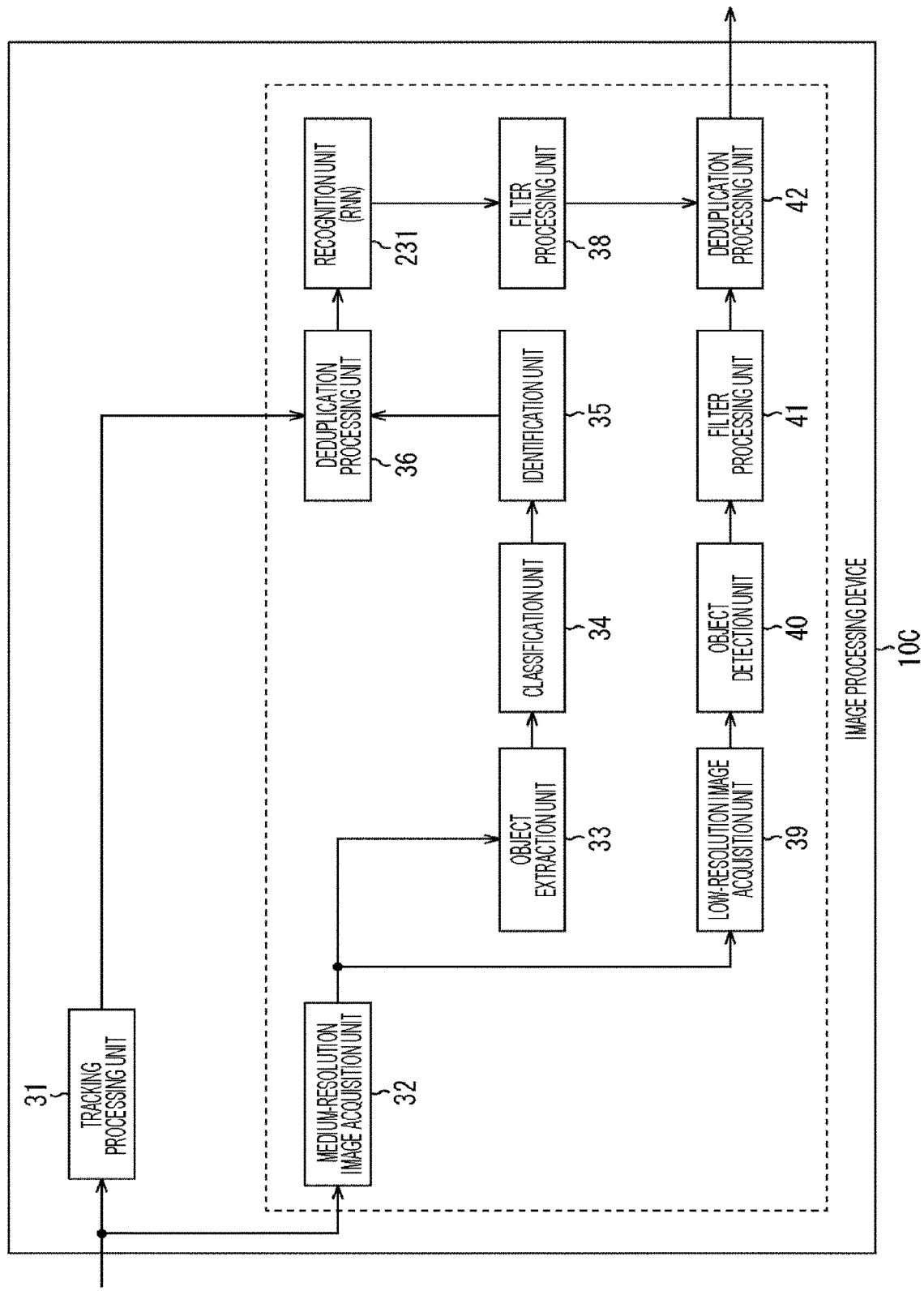
FIG. 17 is a block diagram showing yet another functional configuration example of the image processing device.

FIG. 17 is a block diagram showing a functional configuration example of an image processing device 10C, which is a third modification of the image processing device 10.

The image processing device 10C of FIG. 17 is different from the image processing device 10 of FIG. 1 in that a recognition unit 231 is provided instead of the recognition unit 37.

The recognition unit 231 uses a recurrent neural network (RNN) to perform moving object recognition processing on a dynamic image instead of a static image every 15 frames.

With such a configuration, it is possible to perform recognition processing with high accuracy even for a small object that goes in and out of shadows of other objects.

(Modification 4)

Figure 18:
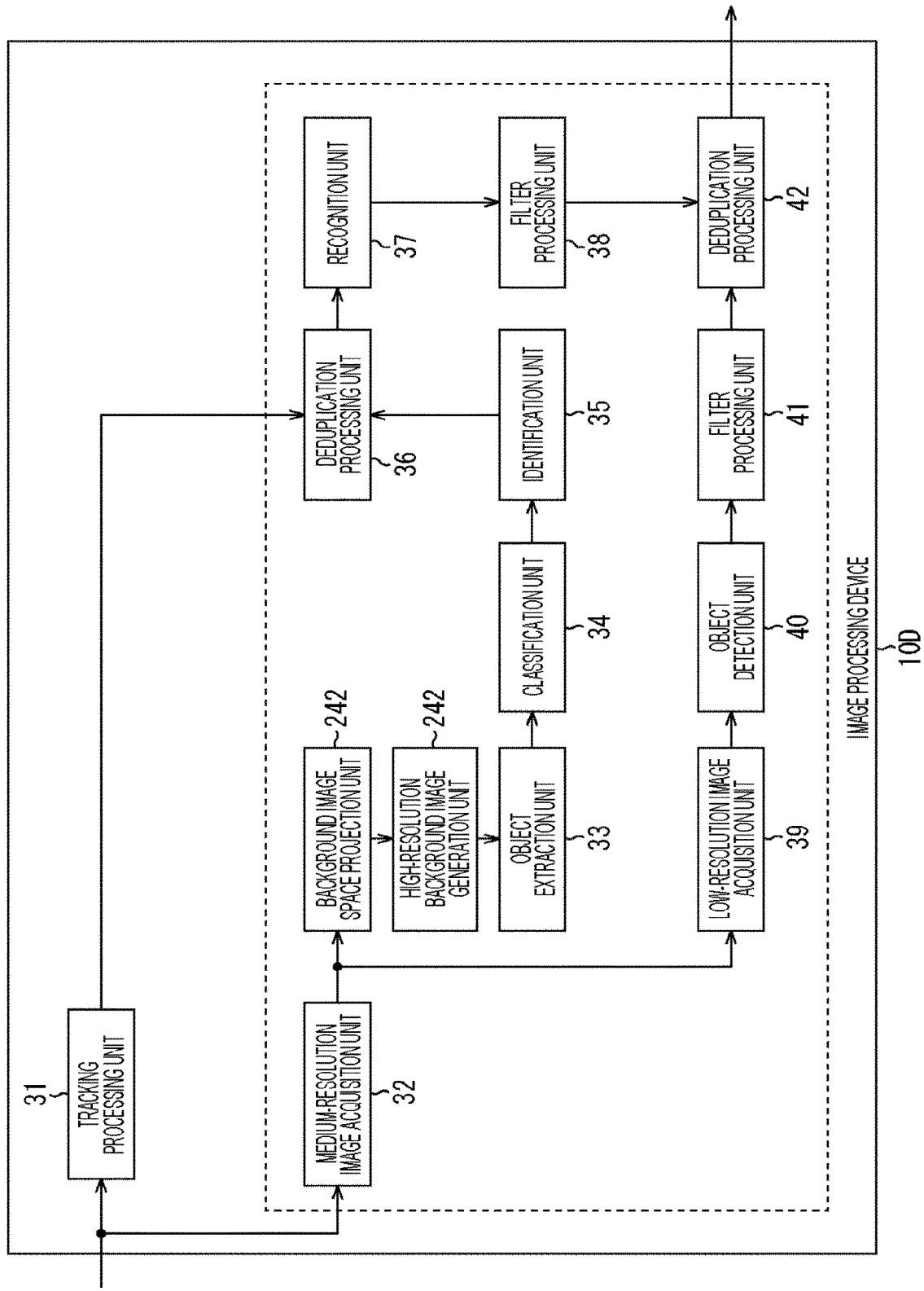
FIG. 18 is a block diagram showing yet another functional configuration example of the image processing device.

FIG. 18 is a block diagram showing a functional configuration example of an image processing device 10D, which is a fourth modification of the image processing device 10.

The image processing device 10D of FIG. 18 is different from the image processing device 10 of FIG. 1 in that a background image space projection unit 241 and a high-resolution background image generation unit 242 are provided prior to an object extraction unit 33.

The background image space projection unit 241 updates a background image by projecting a medium-resolution image from a medium-resolution image acquisition unit 32 onto a background image space. The medium-resolution image projected onto the background image space is supplied to the high-resolution background image generation unit 242. The background image space corresponds to an imaging range that can be imaged by an imaging device 21. In a case where there is movement in the imaging range of the imaging device 21, the background image changes temporally in the background image space.

Figure 19:
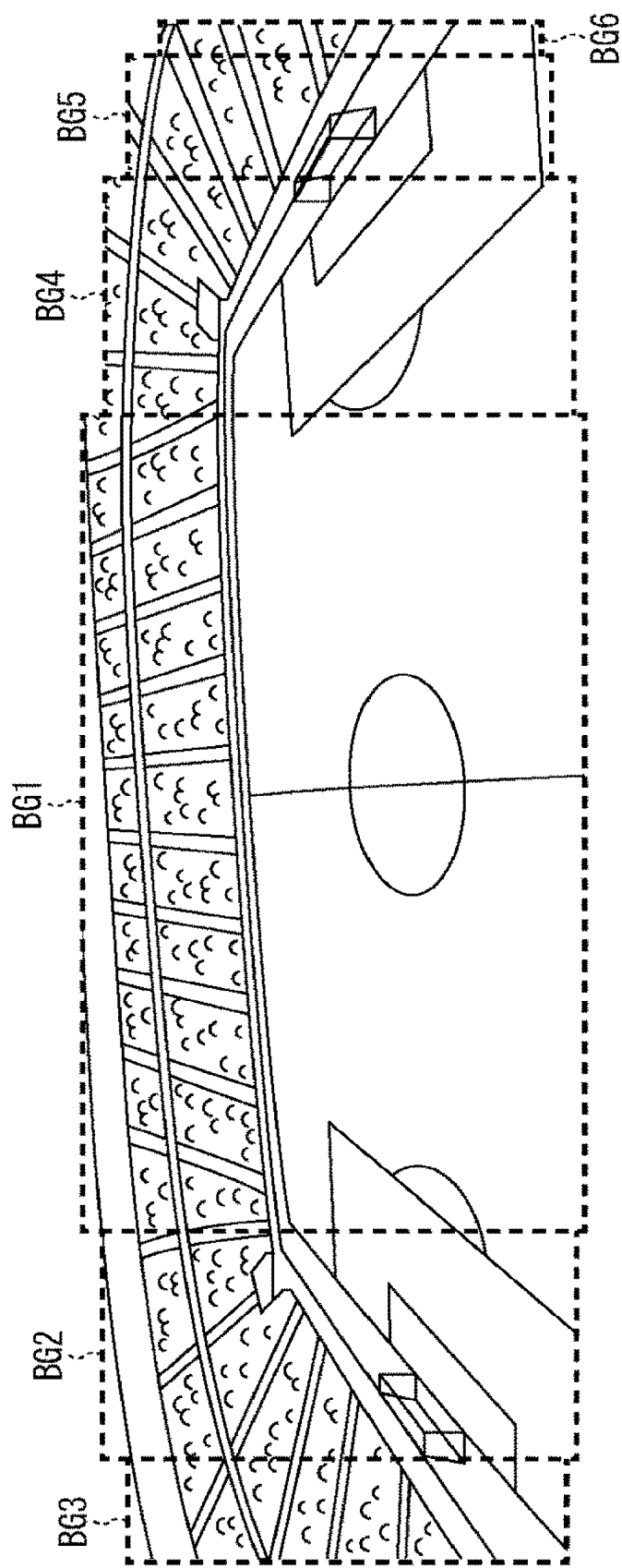
FIG. 19 is a diagram showing an example of a background image updated by projection onto a background image space.

FIG. 19 is a diagram showing an example of a background image updated by projection onto the background image space.

The background image shown in FIG. 19 includes background images BG1 to BG5 captured in five different imaging ranges. In a case where a medium-resolution image having an imaging range different from that of the background images BG1 to BG5 is supplied from the medium-resolution image acquisition unit 32, the medium-resolution image is projected at a position corresponding to the imaging range in the background image space, and the background image of FIG. 19 is updated.

The high-resolution background image generation unit 242 generates a high-resolution background image by enlarging (increasing the resolution) the background portion in the medium-resolution image projected onto the background image space from the background image space projection unit 241. The generated high-resolution background image is supplied to the object extraction unit 33.

With such a configuration, it is possible to improve the extraction accuracy of smaller moving objects even in a case where there is movement in the imaging range of the imaging device 21.

(Modification 5)

Figure 20:
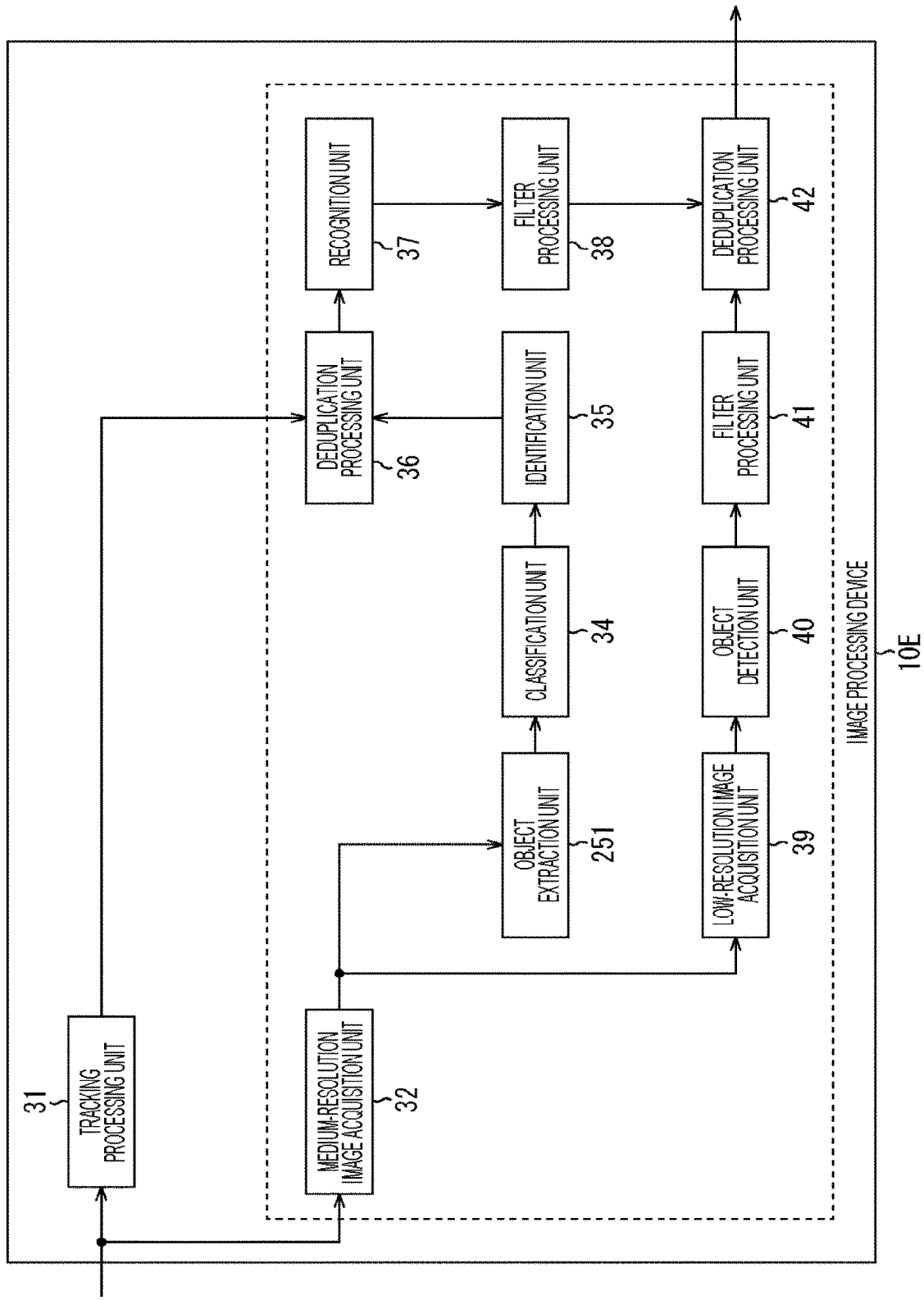
FIG. 20 is a block diagram showing yet another functional configuration example of the image processing device.

FIG. 20 is a block diagram showing a functional configuration example of an image processing device 10E, which is a fifth modification of the image processing device 10.

The image processing device 10E of FIG. 20 is different from the image processing device 10 of FIG. 1 in that an object extraction unit 251 is provided in place of the object extraction unit 33.

The object extraction unit 251 extracts an object of a predetermined color in a medium-resolution image from a medium-resolution image acquisition unit 32. As shown in FIG. 21, for example, the object extraction unit 251 extracts only objects having an H (hue) of 80 to 120 in an HSV color space in a medium-resolution image. Information indicating the extracted objects is supplied to a classification unit 34.

With such a configuration, it is possible to track a small object of a specific color in a high-resolution image.

(Modification 6)

Figure 22:
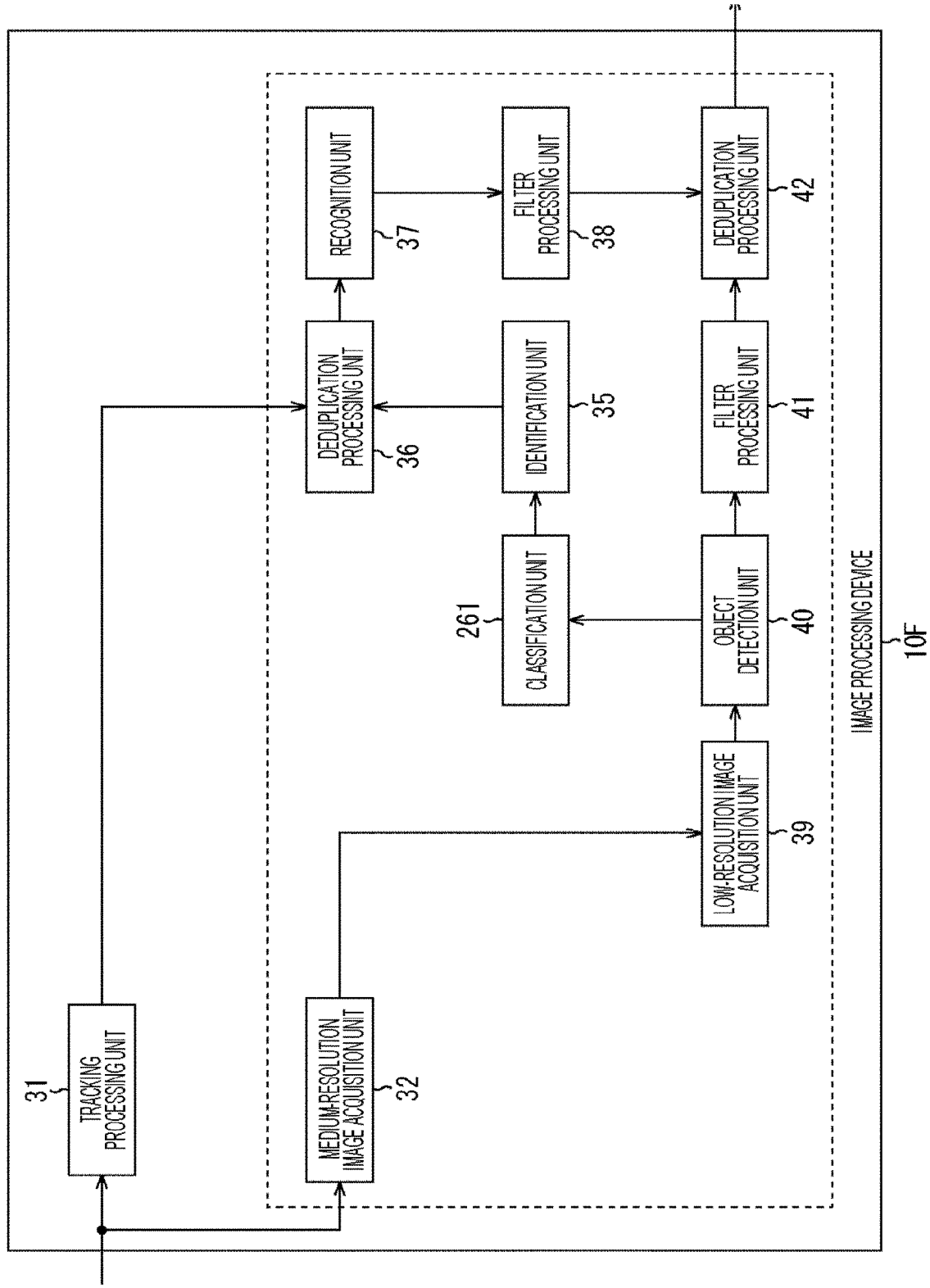
FIG. 22 is a block diagram showing yet another functional configuration example of the image processing device.

FIG. 22 is a block diagram showing a functional configuration example of an image processing device 10F, which is a sixth modification of the image processing device 10.

The image processing device 10F of FIG. 22 is different from the image processing device 10 of FIG. 1 in that the object extraction unit 33 is not provided and a classification unit 261 is provided instead of the classification unit 34.

The classification unit 261 classifies an object included in a low-resolution image on the basis of its size, for example, on the basis of the object detection result from an object detection unit 40. The classification unit 34 supplies information indicating the classified object to an identification unit 35. The processing from the identification unit 35 to a filter processing unit 38 is performed on the object classified in the low-resolution image.

With such a configuration, it is possible to track a relatively small object in a high-resolution image.

(Other Modification)

In the above example, the recognition unit 37 performs binary classification on the object area in the moving object recognition processing. However, in a case where there are multiple types of small objects to be recognized, the recognition unit 37 may perform multiclass classification on the object area in the moving object recognition processing. As a result, it is possible to detect non-aircraft objects (organisms) such as birds in addition to aircraft, for example.

Additionally, when the recognition unit 37 performs the recognition processing of the aircraft, the recognition unit 37 may perform recognition processing of the color of the aircraft or characters (company name or its abbreviation) drawn on the aircraft, for example. As a result, it becomes possible to determine which airline the recognized aircraft belongs to.

Additionally, in the above-mentioned example, the classification unit 34 classifies the moving object on the basis of the size of the moving object. However, the moving object may be further classified on the basis of the position of the moving object on the image or the speed of movement of the moving object.

In the case where the moving object is classified on the basis of the position of the moving object in the image, by classifying moving objects in the sky area, for example, it is possible to detect only the aircraft flying in the sky. Additionally, by classifying moving objects in the area of the paved surface, it is possible to detect only the aircraft taxiing on the ground (runway).

Additionally, in the case where the moving object is classified on the basis of the speed of movement of the moving object, by classifying moving objects moving at a low speed, for example, it is possible to detect only the aircraft flying in the distant sky. The speed of movement of a moving object can be obtained by dividing a distance obtained by comparing positions of the moving object in two consecutive frames by the time between the two frames, for example. Additionally, the movement of the coordinate position of the moving object may be tracked so that the aircraft can be detected depending on whether or not the moving object is moving at a constant velocity in time series. Note that a moving object that moves so fast that it exceeds the image frame of the tracking processing may be excluded from the tracking target.

5. Configuration Example of Computer

The series of processing described above can be performed by hardware or software. In a case where the series of processing is executed by software, a program forming the software is installed from a program recording medium to a computer incorporated in dedicated hardware, a general-purpose personal computer, or the like.

Figure 23:
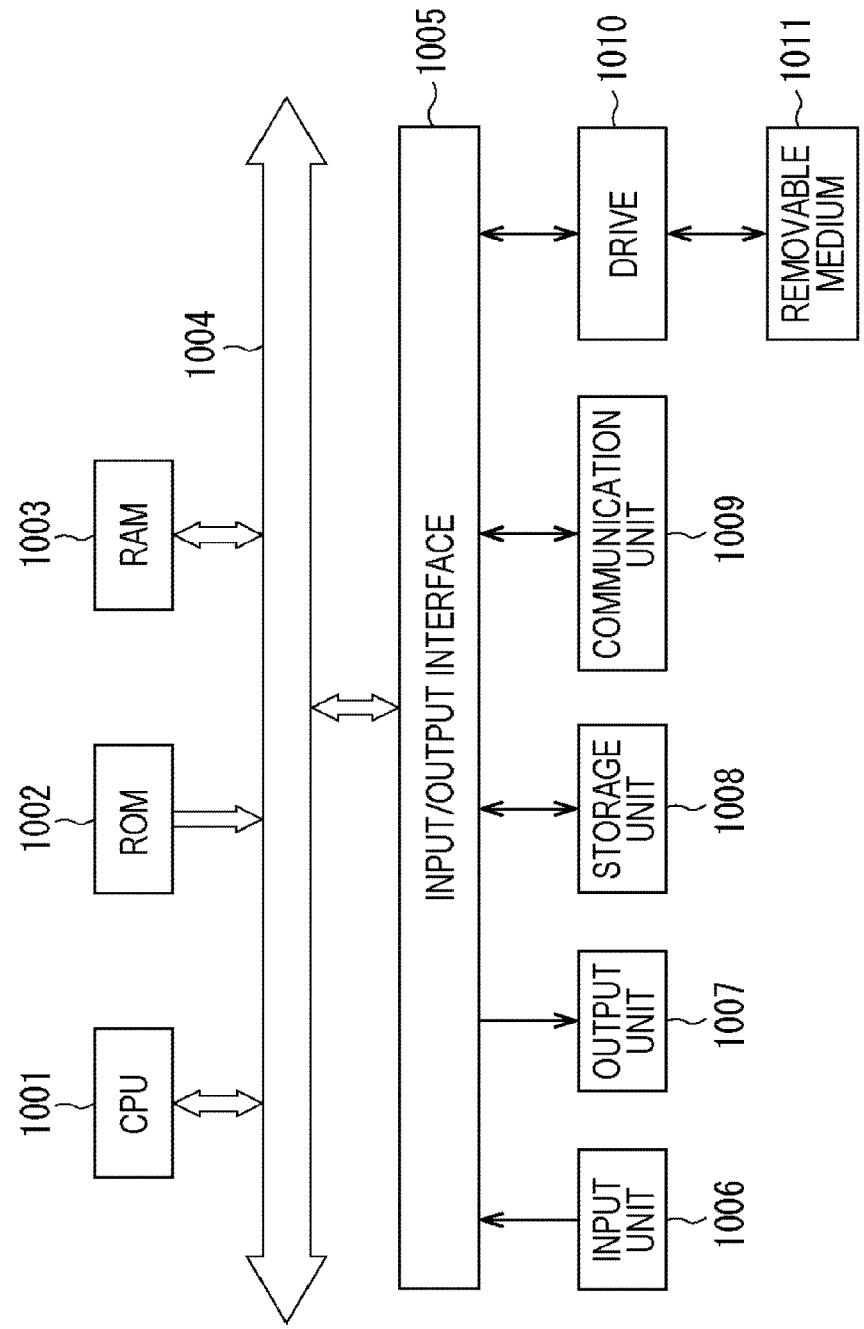
FIG. 23 is a block diagram showing a configuration example of a computer.

FIG. 23 is a block diagram showing a hardware configuration example of a computer that executes the series of processing described above according to a program.

The image processing device 10 described above is implemented by a computer having the configuration shown in FIG. 23.

A CPU 1001, a ROM 1002, and a RAM 1003 are mutually connected by a bus 1004.

An input/output interface 1005 is also connected to the bus 1004. An input unit 1006 including a keyboard, a mouse, and the like, and an output unit 1007 including a display, a speaker, and the like are connected to the input/output interface 1005. Additionally, a storage unit 1008 such as a hard disk and a non-volatile memory, a communication unit 1009 such as a network interface, and a drive 1010 for driving a removable medium 511 are connected to the input/output interface 1005.

In the computer configured as described above, the CPU 1001 loads a program stored in the storage unit 1008 onto the RAM 1003 through the input/output interface 1005 and the bus 1004, and executes the program to perform the above-described series of processing, for example.

The program executed by the CPU 1001 is provided by being recorded in the removable medium 1011 or through a wired or wireless transmission medium such as a local area network, the Internet, or digital broadcasting, and is installed in the storage unit 1008, for example.

Note that the program executed by the computer may be a program that performs processing in chronological order according to the order described in the present specification, or a program that performs processing in parallel, or at a necessary timing such as when a call is made.

6. Application Example

In the above, the technology according to the present disclosure is applied to a configuration for tracking a small object such as an aircraft flying in a distant place in an image obtained by a camera system of a remote control tower. In addition to this, the technology according to the present disclosure may be applied to a configuration for tracking a distant person or small animal in an image obtained by a remote monitoring device that monitors a building, a factory, a store, a city, or the like at a remote location. Additionally, the technology according to the present disclosure may be applied to a configuration for tracking a ball in a relay image of a sport such as soccer or baseball.

Moreover, the technology according to the present disclosure can be applied to various products.

(Application to Operating Room System)

For example, the technology of the present disclosure may be applied to an operating room system.

Figure 24:
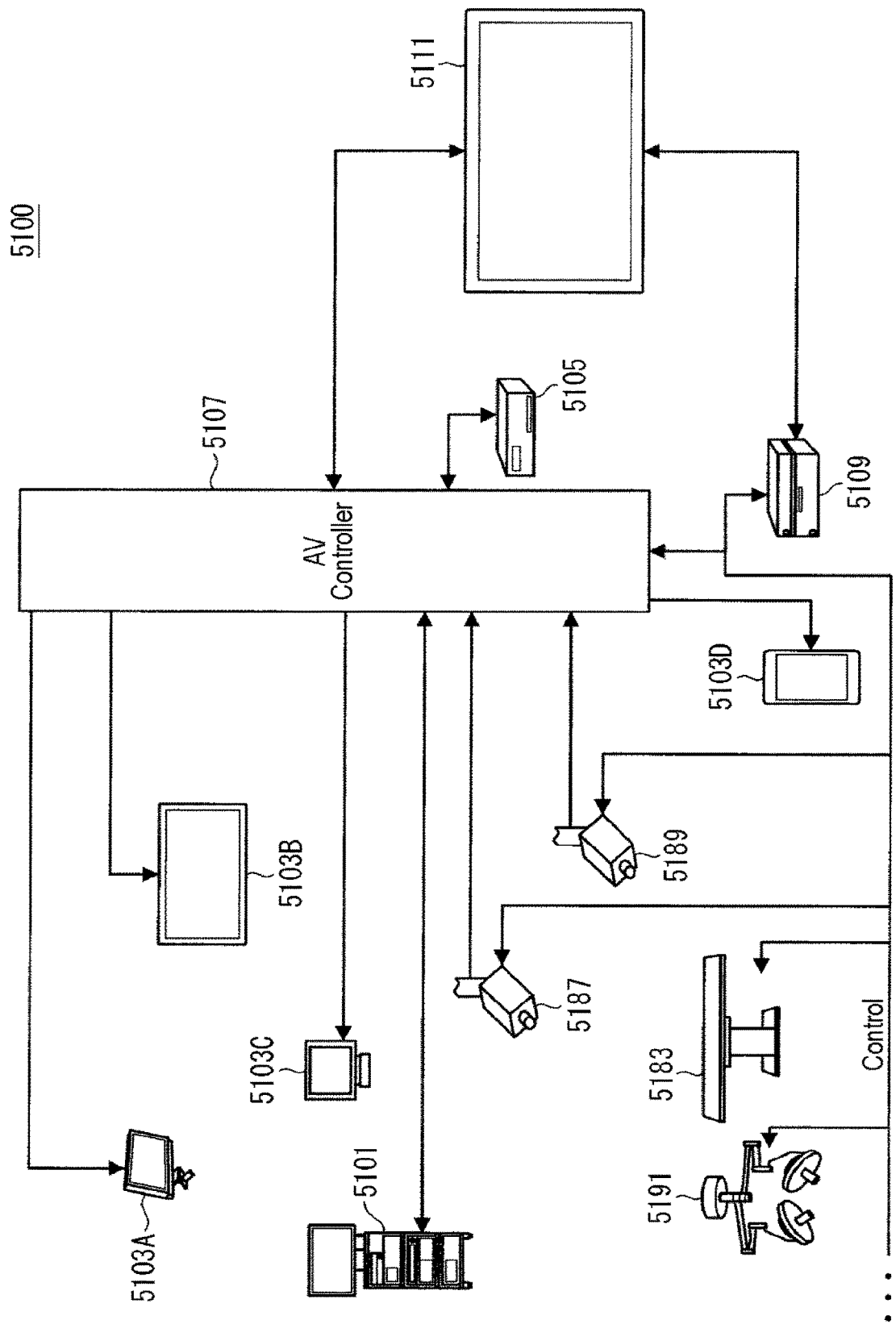
FIG. 24 is a diagram schematically showing an overall configuration of an operating room system.

FIG. 24 is a diagram schematically showing an overall configuration of an operating room system 5100 to which the technology according to the present disclosure can be applied. Referring to FIG. 24, the operating room system 5100 is configured by connecting a group of devices installed in the operating room in a coordinated manner through an audiovisual controller (AV controller) 5107 and an operating room control device 5109.

Various devices can be installed in the operating room. As an example, FIG. 24 shows a device group 5101 for endoscopic surgery, a ceiling camera 5187 installed on the ceiling of the operating room to image the operator's hand, and an operating room camera 5189 installed on the ceiling of the operating room to image the situation of the entire operating room, multiple display devices 5103A to 5103D, a recorder 5105, a patient bed 5183, and a lighting 5191.

Here, among these devices, the device group 5101 belongs to an endoscopic surgery system 5113, which will be described later, and includes an endoscope, a display device for displaying an image captured by the endoscope, and the like. Each device belonging to the endoscopic surgery system 5113 is also called medical equipment. On the other hand, the display devices 5103A to 5103D, the recorder 5105, the patient bed 5183, and the lighting 5191 are devices provided separately from the endoscopic surgery system 5113 in the operating room, for example. Each of these devices that does not belong to the endoscopic surgery system 5113 is also called non-medical equipment. The audiovisual controller 5107 and/or the operating room control device 5109 controls the operation of the medical equipment and non-medical equipment in cooperation with each other.

The audiovisual controller 5107 comprehensively controls processing related to image display in medical equipment and non-medical equipment. Specifically, among the devices included in the operating room system 5100, the device group 5101, the ceiling camera 5187, and the operating room camera 5189 may be devices (hereinafter also referred to as source devices) having a function of transmitting information to be displayed during surgery (hereinafter also referred to as display information). Additionally, the display devices 5103A to 5103D may be devices (hereinafter also referred to as output destination devices) on which display information is output. Additionally, the recorder 5105 may be a device corresponding to both the source device and the output destination device. The audiovisual controller 5107 has a function of controlling the operation of the source device and the output destination device, acquiring display information from the source device, and transmitting the display information to the output destination device for display or recording. Note that the display information includes various images captured during the surgery and various information related to the surgery (e.g., physical information of patient, past test results, information on surgical procedure, and the like).

Specifically, the audiovisual controller 5107 may receive from the device group 5101, as display information, information about an image of the surgical site in the body cavity of the patient captured by the endoscope. Additionally, the audiovisual controller 5107 may receive from the ceiling camera 5187, as display information, information about an image of the operator's hand captured by the ceiling camera 5187. Additionally, the audiovisual controller 5107 may receive from the operating room camera 5189, as display information, information about an image showing the situation of the entire operating room captured by the operating room camera 5189. Note that if the operating room system 5100 has another device having an imaging function, the audiovisual controller 5107 may also acquire information about an image captured by the other device from the other device as display information.

Alternatively, for example, the audiovisual controller 5107 records information about these previously captured images in the recorder 5105. The audiovisual controller 5107 can acquire the information about the previously captured image from the recorder 5105 as display information. Note that various information related to surgery may also be recorded in advance in the recorder 5105.

The audiovisual controller 5107 displays the acquired display information (i.e., image captured during surgery and various information regarding surgery) on at least one of the display devices 5103A to 5103D that are output destination devices. In the example shown in FIG. 24, the display device 5103A is a display device suspended from the ceiling of the operating room, the display device 5103B is a display device installed on a wall surface of the operating room, the display device 5103C is a display device installed on a desk in the operating room, and the display device 5103D is a mobile device (e.g., tablet personal computer (PC)) having a display function.

Additionally, although not shown in FIG. 24, the operating room system 5100 may include a device outside the operating room. The device outside the operating room may be, for example, a server connected to a network constructed inside or outside the hospital, a PC used by medical staff, a projector installed in a conference room of the hospital, or the like. In a case where such an external device is located outside the hospital, the audiovisual controller 5107 can also display display information on a display device of another hospital through a video conferencing system or the like for telemedicine.

The operating room control device 5109 comprehensively controls processing other than processing related to image display in non-medical equipment. For example, the operating room control device 5109 controls driving of the patient bed 5183, the ceiling camera 5187, the operating room camera 5189, and the lighting 5191.

The operating room system 5100 is provided with a centralized operation panel 5111, and the user can give, through the centralized operation panel 5111, an instruction regarding image display to the audiovisual controller 5107 or an instruction regarding the operation of non-medical equipment to the operating room control device 5109. The centralized operation panel 5111 includes a touch panel provided on a display surface of the display device.

Figure 25:
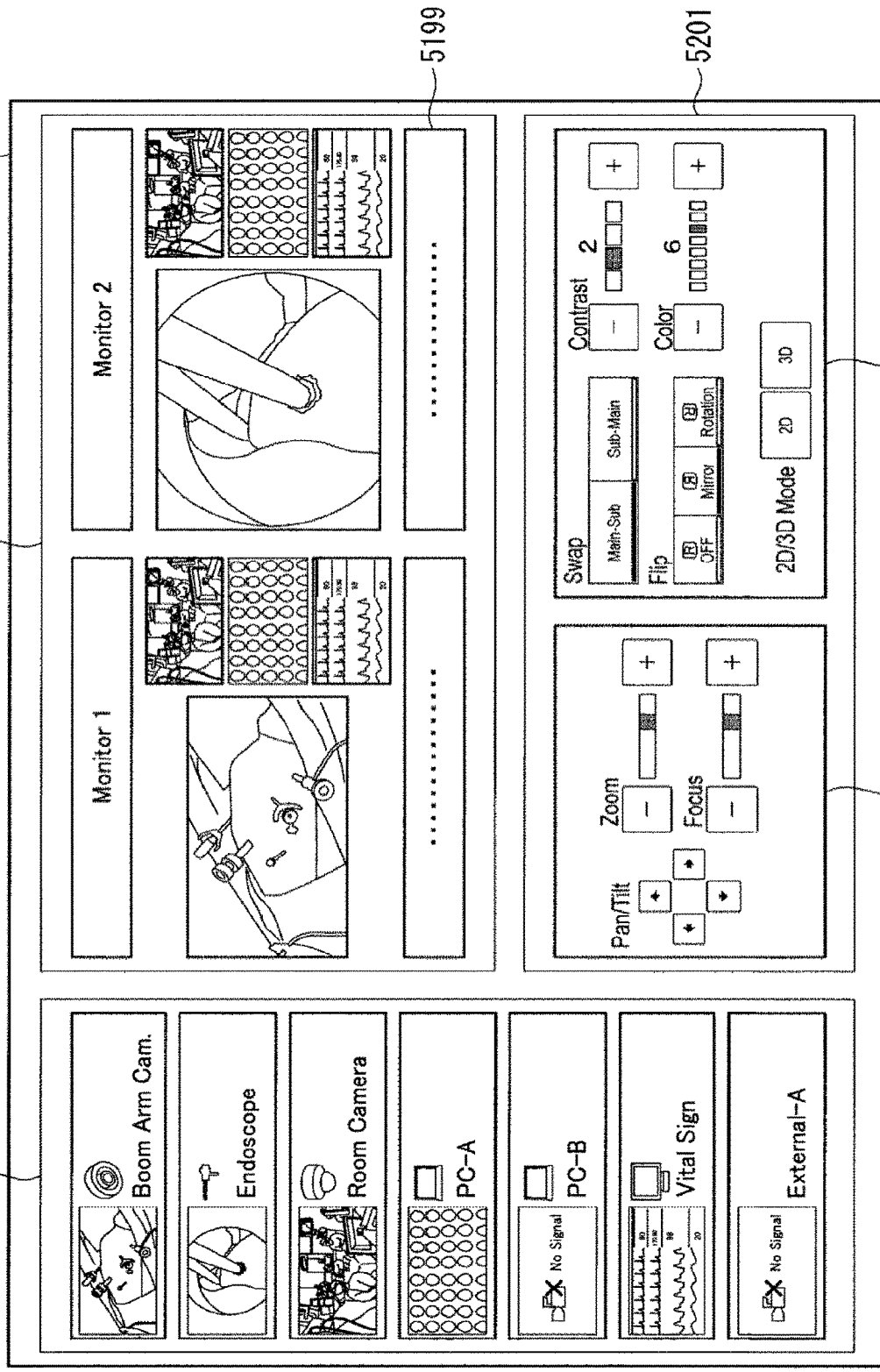
FIG. 25 is a diagram showing a display example of an operation screen on a centralized operation panel.

FIG. 25 is a diagram showing a display example of an operation screen on the centralized operation panel 5111. FIG. 25 shows, as an example, an operation screen corresponding to a case where the operating room system 5100 is provided with two display devices as output destination devices. Referring to FIG. 25, an operation screen 5193 is provided with a source selection area 5195, a preview area 5197, and a control area 5201.

In the source selection area 5195, the source device provided in the operating room system 5100 and a thumbnail screen showing the display information possessed by the source device are linked and displayed. The user can select the display information that he/she wants to display on the display device from any of the source devices displayed in the source selection area 5195.

In the preview area 5197, a preview of the screen displayed on the two display devices (Monitor1 and Monitor2), which are the output destination devices, is displayed. In the example shown in FIG. 25, four images are displayed in PinP on one display device. The four images correspond to the display information transmitted from the source devices selected in the source selection area 5195. Of the four images, one is displayed relatively large as a main image and the remaining three are displayed relatively small as sub-images. The user can swap the main image and the sub image by appropriately selecting the area where the four images are displayed. Additionally, a status display area 5199 is provided below the area where the four images are displayed, and a status related to the surgery (e.g., elapsed time of surgery, physical information of patient, or the like) may be appropriately displayed in the area.

The control area 5201 includes a source operation area 5203 in which graphical user interface (GUI) parts for operating the source device are displayed, and an output destination operation area 5205 in which GUI parts for operating the output destination device are displayed. In the example shown in FIG. 25, the source operation area 5203 includes GUI parts for performing various operations (pan, tilt, and zoom) on the camera in the source device having an imaging function. The user can operate the operation of the camera in the source device by appropriately selecting these GUI parts. Note that although not shown, in a case where the source device selected in the source selection area 5195 is a recorder (i.e., case where image previously recorded in recorder is displayed in preview area 5197), the source operation area 5203 may include GUI parts for performing operations such as playing, stopping, rewinding, and fast-forwarding the image.

Additionally, the output destination operation area 5205 includes GUI parts for performing various operations (swap, flip, color adjustment, contrast adjustment, switching between 2D display and 3D display) for the display on the display device which is the output destination device. The user can operate the display on the display device by appropriately selecting these GUI parts.

Note that the operation screen displayed on the centralized operation panel 5111 is not limited to the example shown in FIG. 25, and the user may be allowed to input operation to devices controllable by the audiovisual controller 5107 and the operating room control device 5109 provided in the operating room system 5100, through the centralized operation panel 5111.

Figure 26:
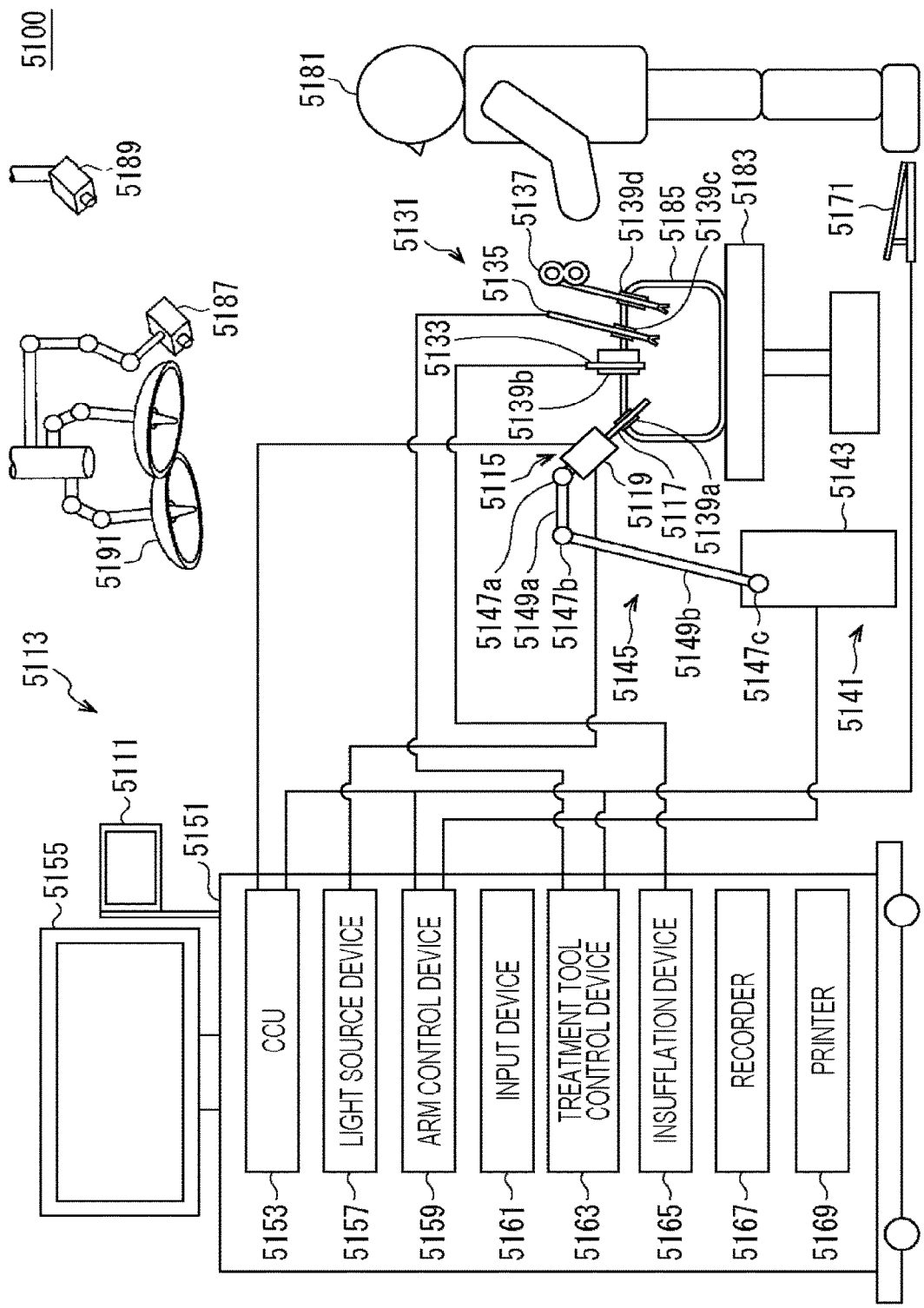
FIG. 26 is a diagram showing an example of a situation of surgery to which the operating room system is applied.

FIG. 26 is a diagram showing an example of a situation of surgery to which the operating room system described above is applied. The ceiling camera 5187 and the operating room camera 5189 are installed on the ceiling of the operating room, and can image the hand of an operator (surgeon) 5181 who treats the affected area of a patient 5185 on the patient bed 5183 and the situation of the entire operating room. The ceiling camera 5187 and the operating room camera 5189 may be provided with a magnification adjustment function, a focal length adjustment function, an imaging direction adjustment function, and the like. The lighting 5191 is installed on the ceiling of the operating room and illuminates at least the hand of the operator 5181. The lighting 5191 may be capable of appropriately adjusting the amount of irradiation light, the wavelength (color) of the irradiation light, the irradiation direction of the light, and the like.

The endoscopic surgery system 5113, the patient bed 5183, the ceiling camera 5187, the operating room camera 5189, and the lighting 5191 are connected in a coordinated manner through the audiovisual controller 5107 and the operating room control device 5109 (not shown in FIG. 26), as shown in FIG. 24. The centralized operation panel 5111 is provided in the operating room, and as described above, the user can appropriately operate the devices existing in the operating room through the centralized operation panel 5111.

Hereinafter, a configuration of the endoscopic surgery system 5113 will be described in detail. As shown in FIG. 26, the endoscopic surgery system 5113 includes an endoscope 5115, other surgical tools 5131, a support arm device 5141 that supports the endoscope 5115, and a cart 5151 on which various devices for endoscopic surgery are mounted.

In endoscopic surgery, instead of cutting the abdominal wall to open the abdomen, multiple tubular opening devices called trocars 5139a to 5139d are punctured in the abdominal wall. Then, a lens barrel 5117 of the endoscope 5115 and the other surgical tools 5131 are inserted into the body cavity of the patient 5185 from the trocars 5139a to 5139d. In the example shown in FIG. 26, an insufflation tube 5133, an energy treatment tool 5135, and forceps 5137 are inserted into the body cavity of the patient 5185 as the other surgical tools 5131. Additionally, the energy treatment tool 5135 is a treatment tool that performs incision and peeling of tissue, sealing of blood vessels, or the like by high-frequency current or ultrasonic vibration. Note, however, that the illustrated surgical tools 5131 are merely an example, and various surgical tools generally used in endoscopic surgery, such as tweezers and a retractor, may be used as the surgical tools 5131.

An image of the surgical site in the body cavity of the patient 5185 captured by the endoscope 5115 is displayed on a display device 5155. The operator 5181 uses the energy treatment tool 5135 and the forceps 5137 while viewing in real time the image of the surgical site displayed on the display device 5155, and performs treatment such as excising the affected area. Note that although illustration is omitted, the insufflation tube 5133, the energy treatment tool 5135, and the forceps 5137 are supported by the operator 5181 or an assistant during surgery.

(Support Arm Device)

The support arm device 5141 includes an arm portion 5145 extending from a base portion 5143. In the example shown in FIG. 26, the arm portion 5145 includes joint portions 5147a, 5147b, and 5147c and links 5149a and 5149b, and is driven by control from an arm control device 5159. The arm portion 5145 supports the endoscope 5115, and controls its position and posture. As a result, the position of the endoscope 5115 can be stably fixed.

(Endoscope)

The endoscope 5115 includes the lens barrel 5117 whose area of a predetermined length from the tip end is inserted into the body cavity of the patient 5185, and a camera head 5119 connected to the base end of the lens barrel 5117. While FIG. 26 shows an example in which the endoscope 5115 is configured as a so-called rigid endoscope having a hard lens barrel 5117, the endoscope 5115 may be configured as a so-called flexible endoscope having a soft lens barrel 5117.

An opening into which an objective lens is fitted is provided at the tip end of the lens barrel 5117. A light source device 5157 is connected to the endoscope 5115, and light generated by the light source device 5157 is guided to the tip end of the lens barrel by a light guide extending inside the lens barrel 5117. The light is radiated toward the observation target in the body cavity of the patient 5185 through the objective lens. Note that the endoscope 5115 may be a forward-viewing endoscope, an oblique-viewing endoscope, or a side-viewing endoscope.

An optical system and an imaging device are provided inside the camera head 5119, and reflected light (observation light) from an observation target is focused on the imaging device by the optical system. Observation light is photoelectrically converted by the imaging device, and an electric signal corresponding to the observation light, that is, an image signal corresponding to the observed image is generated. The image signal is transmitted to a camera control unit (CCU) 5153 as RAW data. Note that the camera head 5119 has a function of adjusting the magnification and the focal length by appropriately driving the optical system.

Note that the camera head 5119 may be provided with multiple imaging devices in order to support stereoscopic viewing (3D display), for example. In this case, multiple relay optical systems are provided inside the lens barrel 5117 in order to guide the observation light to each of the multiple imaging devices.

(Various Devices Mounted on Cart)

The CCU 5153 includes a central processing unit (CPU), a graphics processing unit (GPU), and the like, and performs centralized control of operations of the endoscope 5115 and the display device 5155. Specifically, the CCU 5153 performs, on an image signal received from the camera head 5119, various image processing for displaying an image based on the image signal such as development processing (demosaicing processing). The CCU 5153 provides the image signal subjected to the image processing to the display device 5155. Additionally, the audiovisual controller 5107 shown in FIG. 24 is connected to the CCU 5153. The CCU 5153 provides the image signal subjected to image processing to the audiovisual controller 5107 as well. Additionally, the CCU 5153 also sends a control signal to the camera head 5119 to control the driving thereof. The control signal may include information regarding imaging conditions such as magnification and focal length. The information regarding the imaging conditions may be input through an input device 5161 or may be input through the centralized operation panel 5111 described above.

The display device 5155 displays an image based on the image signal subjected to image processing by the CCU 5153 under the control of the CCU 5153. In a case where the endoscope 5115 is compatible with high-resolution imaging such as 4K (horizontal pixel 3840×vertical pixel 2160) or 8K (horizontal pixel 7680×vertical pixel 4320), and/or 3D display, a device capable of high-resolution display and/or a device capable of 3D display can be used as the display device 5155 corresponding to the endoscopes 5115. In the case where the display device 5155 is compatible with high-resolution imaging such as 4K or 8K, a more immersive feeling can be obtained by using a display device 5155 having a size of 55 inches or more. Additionally, multiple display devices 5155 having different resolutions and sizes may be provided depending on the application.

The light source device 5157 includes a light source such as a light emitting diode (LED), for example, and supplies irradiation light for imaging a surgical site to the endoscope 5115.

The arm control device 5159 includes a processor such as a CPU, for example, and operates according to a predetermined program to control driving of the arm portion 5145 of the support arm device 5141 according to a predetermined control method.

The input device 5161 is an input interface for the endoscopic surgery system 5113. The user can input various information and instructions to the endoscopic surgery system 5113 through the input device 5161. For example, the user inputs various kinds of information regarding the surgery, such as physical information of the patient and information regarding the surgical procedure, through the input device 5161. Additionally, for example, the user inputs, through the input device 5161, an instruction to drive the arm portion 5145, an instruction to change the imaging conditions (type of irradiation light, magnification, focal length, and the like) of the endoscope 5115, an instruction to drive the energy treatment tool 5135, and the like.

The type of the input device 5161 is not limited, and the input device 5161 may be various known input devices. As the input device 5161, a mouse, a keyboard, a touch panel, a switch, a foot switch 5171 and/or a lever can be applied, for example. In a case where a touch panel is used as the input device 5161, the touch panel may be provided on the display surface of the display device 5155.

Alternatively, the input device 5161 is a device worn by the user, such as a glasses-type wearable device or a head mounted display (HMD), and various inputs are performed according to the user's gesture or line-of-sight detected by these devices. Additionally, the input device 5161 includes a camera capable of detecting the movement of the user, and various inputs are performed according to the user's gesture or line-of-sight detected from an image captured by the camera. Moreover, the input device 5161 includes a microphone capable of collecting the voice of the user, and various inputs are performed by voice through the microphone. As described above, since the input device 5161 is capable of inputting various information in a contactless manner, a user (e.g., operator 5181) who belongs to a clean area can operate devices belonging to an unclean area in a contactless manner. Additionally, the user can operate the devices without releasing his/her hand from the surgical tool, which is convenient for the user.

A treatment tool control device 5163 controls driving of the energy treatment tool 5135 for tissue ablation, incision, blood vessel sealing, or the like. In order to inflate the body cavity of the patient 5185 for the purpose of securing the visual field of the endoscope 5115 and securing the operator's work space, an insufflation device 5165 is used to send gas into the body cavity through the insufflation tube 5133. A recorder 5167 is a device capable of recording various information related to surgery. A printer 5169 is a device capable of printing various information related to surgery in various formats such as text, images, or graphs.

Hereinafter, a particularly characteristic configuration of the endoscopic surgery system 5113 will be described in more detail.

(Support Arm Device)

The support arm device 5141 includes the base portion 5143, which is a base, and the arm portion 5145 extending from the base portion 5143. While the arm portion 5145 of the example shown in FIG. 26 includes the multiple joint portions 5147*a*, 5147*b*, and 5147*c* and the multiple links 5149*a* and 5149*b* connected by the joint portion 5147*b*, in FIG. 26, for simplicity, the configuration of the arm portion 5145 is shown in a simplified manner. In practice, the shapes, the number, and the arrangement of the joint portions 5147*a* to 5147*c* and the links 5149*a* and 5149*b*, the directions of the rotation axes of the joint portions 5147*a* to 5147*c*, and the like may be appropriately set to achieve a desired degree of freedom for the arm portion 5145. For example, the arm portion 5145 may be suitably configured to have six or more degrees of freedom. As a result, the endoscope 5115 can be freely moved within the movable range of the arm portion 5145, so that the lens barrel 5117 of the endoscope 5115 can be inserted into the body cavity of the patient 5185 from a desired direction.

The joint portions 5147*a* to 5147*c* are provided with actuators, and the joint portions 5147*a* to 5147*c* are rotatable about predetermined rotation axes by driving the actuators. Driving of the actuator is controlled by the arm control device 5159, whereby the rotation angles of the joint portions 5147*a* to 5147*c* are controlled and driving of the arm portion 5145 is controlled. As a result, the position and posture of the endoscope 5115 can be controlled. At this time, the arm control device 5159 can control driving of the arm portion 5145 by various known control methods such as force control or position control.

For example, when the operator 5181 inputs an operation appropriately through the input device 5161 (including foot switch 5171), the arm control device 5159 can appropriately control driving of the arm portion 5145 in accordance with the input operation, and control the position and posture of the endoscope 5115. According to this control, the endoscope 5115 at the tip end of the arm portion 5145 can be moved from an arbitrary position to an arbitrary position, and then be fixedly supported at the position to which it is moved. Note that the arm portion 5145 may be operated by a so-called master slave method. In this case, the arm portion 5145 can be remotely operated by the user through the input device 5161 installed at a place away from the operating room.

Additionally, in the case where force control is applied, the arm control device 5159 may perform so-called power assist control in which external force is received from the user, and the actuators of the joint portions 5147*a* to 5147*c* are driven so that the arm portion 5145 moves smoothly according to the external force. As a result, when the user moves the arm portion 5145 while touching the arm portion 5145 directly, he/she can move the arm portion 5145 with a relatively light force. Accordingly, the endoscope 5115 can be moved more intuitively with a more simple operation, which is convenient for the user.

Here, generally, in endoscopic surgery, a surgeon called a scopist supports the endoscope 5115. On the other hand, by using the support arm device 5141, it is possible to more reliably fix the position of the endoscope 5115 without manual labor. Hence, it is possible to reliably obtain an image of the surgical site and perform the operation smoothly.

Note that the arm control device 5159 does not necessarily have to be provided on the cart 5151. Additionally, the arm control device 5159 does not necessarily have to be one device. For example, the arm control device 5159 may be provided in each of the joint portions 5147a to 5147c of the arm portion 5145 of the support arm device 5141, and the multiple arm control devices 5159 may cooperate with each other to control driving of the arm portion 5145.

(Light Source Device)

The light source device 5157 supplies the endoscope 5115 with irradiation light for imaging a surgical site. The light source device 5157 includes an LED, a laser light source, or a white light source including a combination thereof, for example. At this time, in a case where a white light source is configured by a combination of RGB laser light sources, the output intensity and output timing of each color (each wavelength) can be controlled with high accuracy. Hence, white balance of the captured image can be adjusted in the light source device 5157. Additionally, in this case, it is also possible to capture images corresponding to RGB in a time-sharing manner, by irradiating the observation target with the laser light from each of the RGB laser light sources in a time-sharing manner, and controlling driving of the imaging device of the camera head 5119 in synchronization with the irradiation timing. According to this method, a color image can be obtained without providing a color filter in the imaging device.

Additionally, driving of the light source device 5157 may be controlled so as to change the intensity of light to be output every predetermined time. By acquiring images in a time-sharing manner by controlling driving of the imaging device of the camera head 5119 in synchronization with the timing of the change in the intensity of light and synthesizing the images, a wide-dynamic range image without so-called blackout and overexposure can be generated.

Additionally, the light source device 5157 may be capable of supplying light in a predetermined wavelength band corresponding to special light observation. In special light observation, so-called narrow band imaging is performed in which a predetermined tissue such as a blood vessel on the surface of the mucosa is imaged with high contrast, by utilizing the wavelength dependence of light absorption in body tissue and emitting light in a narrower band compared to irradiation light during normal observation (i.e., white light), for example. Alternatively, in special light observation, fluorescence observation may be performed in which an image is obtained by fluorescence generated by emitting excitation light. Examples of fluorescence observation include irradiating the body tissue with excitation light and observing fluorescence from the body tissue (autofluorescence observation), or locally injecting a reagent such as indocyanine green (ICG) into the body tissue and irradiating the body tissue with excitation light corresponding to the fluorescence wavelength of the reagent to obtain a fluorescence image, for example. The light source device 5157 may be capable of supplying narrowband light and/or excitation light corresponding to such special light observation.

(Camera Head and CCU)

Figure 27:
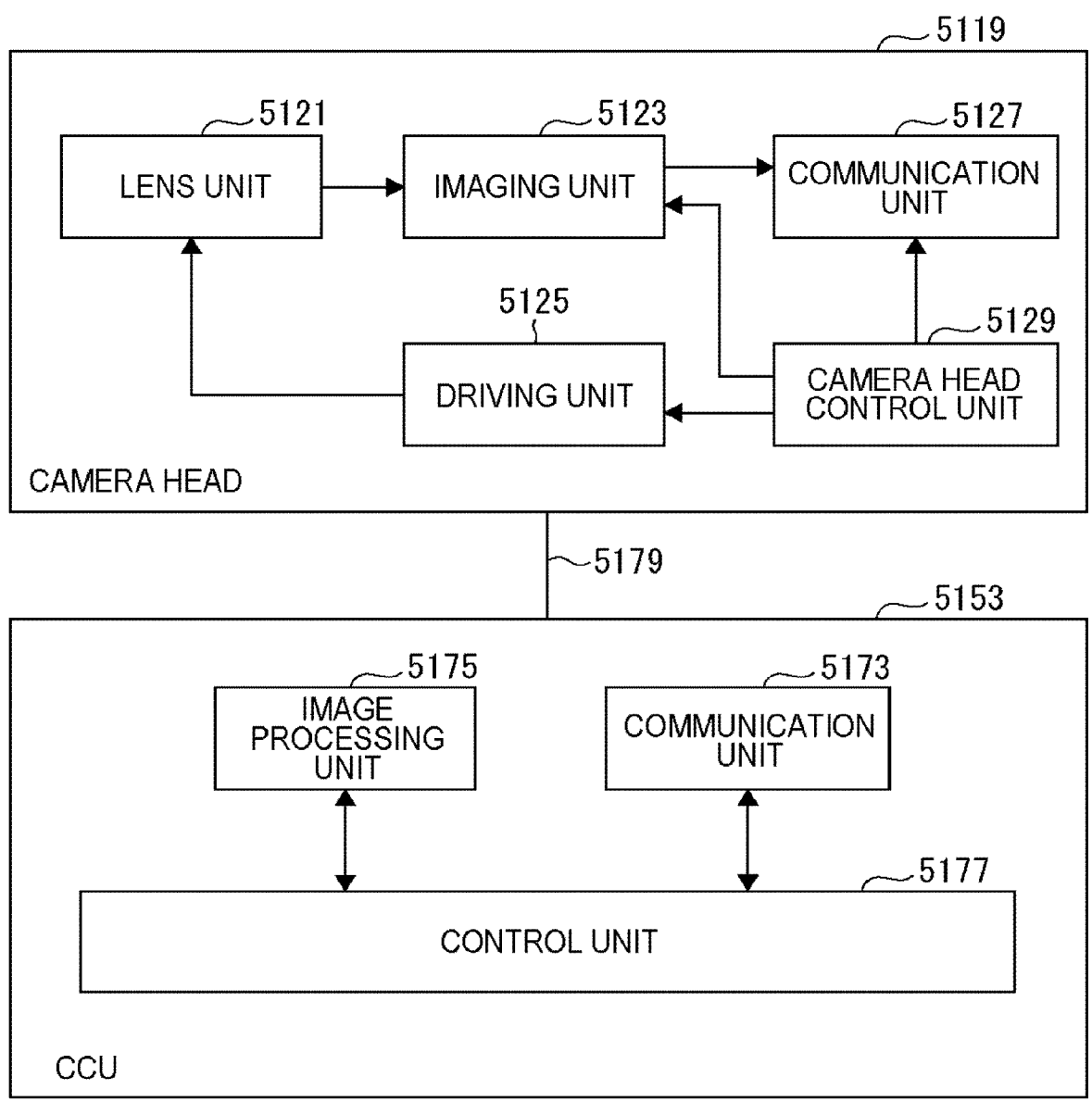
FIG. 27 is a block diagram showing an example of a functional configuration of a camera head and a CCU shown in FIG. 26.

The functions of the camera head 5119 of the endoscope 5115 and the CCU 5153 will be described in more detail with reference to FIG. 27. FIG. 27 is a block diagram showing an example of a functional configuration of the camera head 5119 and the CCU 5153 shown in FIG. 26.

Referring to FIG. 27, the camera head 5119 has, as its functions, a lens unit 5121, an imaging unit 5123, a driving unit 5125, a communication unit 5127, and a camera head control unit 5129. Additionally, the CCU 5153 has, as its functions, a communication unit 5173, an image processing unit 5175, and a control unit 5177. The camera head 5119 and the CCU 5153 are communicably connected to each other by a transmission cable 5179.

First, a functional configuration of the camera head 5119 will be described. The lens unit 5121 is an optical system provided at a connection portion with the lens barrel 5117. Observation light taken in from the tip end of the lens barrel 5117 is guided to the camera head 5119 and enters the lens unit 5121. The lens unit 5121 is configured by combining multiple lenses including a zoom lens and a focus lens. The optical characteristic of the lens unit 5121 is adjusted so that the observation light is focused on the light receiving surface of an imaging device of the imaging unit 5123. Additionally, the zoom lens and the focus lens are configured so that their positions on the optical axis can be moved in order to adjust the magnification and focus of the captured image.

The imaging unit 5123 includes an imaging device, and is arranged subsequent to the lens unit 5121. The observation light that has passed through the lens unit 5121 is focused on the light receiving surface of the imaging device, and an image signal corresponding to the observation image is generated by photoelectric conversion. The image signal generated by the imaging unit 5123 is provided to the communication unit 5127.

As the imaging device included in the imaging unit 5123, a complementary metal oxide semiconductor (CMOS) type image sensor, which has a Bayer array and is capable of color imaging, is used, for example. Note that as the imaging device, a device that supports imaging of a high-resolution image of 4K or higher may be used, for example. By obtaining the image of the surgical site with high resolution, the operator 5181 can grasp the state of the surgical site in more detail, and can proceed with the operation more smoothly.

Additionally, the imaging device included in the imaging unit 5123 has a pair of imaging devices for acquiring the image signals for the right eye and the left eye corresponding to 3D display. The 3D display enables the operator 5181 to grasp the depth of the living tissue in the surgical site more accurately. Note that in a case where the imaging unit 5123 is a multi-plate type, multiple lens units 5121 are provided corresponding to the imaging devices.

Additionally, the imaging unit 5123 does not necessarily have to be provided in the camera head 5119. For example, the imaging unit 5123 may be provided inside the lens barrel 5117 immediately after the objective lens.

The driving unit 5125 includes an actuator, and moves the zoom lens and the focus lens of the lens unit 5121 by a predetermined distance along the optical axis under the control of the camera head control unit 5129. With this configuration, the magnification and focus of the image captured by the imaging unit 5123 can be adjusted as appropriate.

The communication unit 5127 includes a communication device for transmitting and receiving various information to and from the CCU 5153. The communication unit 5127 transmits the image signal obtained from the imaging unit 5123 as RAW data to the CCU 5153 through the transmission cable 5179. At this time, it is preferable that the image signal is transmitted by optical communication in order to display the captured image of the surgical site with low latency. At the time of surgery, the operator 5181 performs the surgery while observing the condition of the affected area with the captured image. Hence, for safer and more reliable surgery, the dynamic image of the surgical site needs to be displayed as close to real-time as possible. In a case where optical communication is performed, the communication unit 5127 is provided with a photoelectric conversion module that converts an electric signal into an optical signal. The image signal is converted into an optical signal by the photoelectric conversion module and then transmitted to the CCU 5153 through the transmission cable 5179.

Additionally, the communication unit 5127 receives a control signal for controlling driving of the camera head 5119 from the CCU 5153. For example, the control signal includes information regarding imaging conditions such as information that specifies the frame rate of the captured image, information that specifies the exposure value at the time of imaging, and/or information that specifies the magnification and focus of the captured image. The communication unit 5127 provides the received control signal to the camera head control unit 5129. Note that the control signal from the CCU 5153 may also be transmitted by optical communication. In this case, the communication unit 5127 is provided with a photoelectric conversion module that converts an optical signal into an electric signal. The control signal is converted into an electric signal by the photoelectric conversion module, and then provided to the camera head control unit 5129.

Note that the imaging conditions such as the frame rate, the exposure value, the magnification, and the focus described above are automatically set by the control unit 5177 of the CCU 5153 on the basis of the acquired image signal. That is, the so-called auto exposure (AE) function, auto focus (AF) function, and auto white balance (AWB) function are installed in the endoscope 5115.

The camera head control unit 5129 controls driving of the camera head 5119 on the basis of a control signal from the CCU 5153 received through the communication unit 5127. For example, the camera head control unit 5129 controls driving of the imaging device of the imaging unit 5123 on the basis of the information that specifies the frame rate of the captured image and/or the information that specifies the exposure at the time of imaging. Additionally, for example, the camera head control unit 5129 appropriately moves the zoom lens and the focus lens of the lens unit 5121 through the driving unit 5125 on the basis of the information that specifies the magnification and the focus of the captured image. The camera head control unit 5129 may further include a function of storing information for identifying the lens barrel 5117 and the camera head 5119.

Note that by arranging the lens unit 5121, the imaging unit 5123, and the like in a hermetically sealed and highly waterproof closed structure, the camera head 5119 can be made resistant to autoclave sterilization processing.

Next, a functional configuration of the CCU 5153 will be described. The communication unit 5173 includes a communication device for transmitting and receiving various information to and from the camera head 5119. The communication unit 5173 receives an image signal transmitted from the camera head 5119 through the transmission cable 5179. At this time, as described above, the image signal can be preferably transmitted by optical communication. In this case, to support optical communication, the communication unit 5173 is provided with a photoelectric conversion module that converts an optical signal into an electric signal. The communication unit 5173 provides the image signal converted into the electric signal to the image processing unit 5175.

Additionally, the communication unit 5173 transmits a control signal for controlling driving of the camera head 5119 to the camera head 5119. The control signal may also be transmitted by optical communication.

The image processing unit 5175 performs various image processing on the image signal that is RAW data transmitted from the camera head 5119. Examples of the image processing include various known signal processing such as development processing, enhancement processing (e.g., band emphasis processing, super-resolution processing, noise reduction (NR) processing and/or camera shake correction processing), and/or enlargement processing (electronic zoom processing). Additionally, the image processing unit 5175 also performs detection processing on the image signal for performing AE, AF, and AWB.

The image processing unit 5175 includes a processor such as a CPU or a GPU, and the image processing and the detection processing described above can be performed by the processor operating according to a predetermined program. Note that in a case where the image processing unit 5175 includes multiple GPUs, the image processing unit 5175 appropriately divides information related to the image signal and performs image processing in parallel by the multiple GPUs.

The control unit 5177 performs various controls related to imaging of the surgical site by the endoscope 5115 and display of the captured image. For example, the control unit 5177 generates a control signal for controlling driving of the camera head 5119. At this time, in a case where the imaging conditions are input by the user, the control unit 5177 generates a control signal on the basis of the input by the user. Alternatively, in a case where the endoscope 5115 is equipped with an AE function, an AF function, and an AWB function, the control unit 5177 appropriately calculates the optimum exposure value, focal length, and white balance depending on the result of the detection processing by the image processing unit 5175, and generates a control signal.

Additionally, the control unit 5177 causes the display device 5155 to display an image of the surgical site on the basis of the image signal subjected to image processing by the image processing unit 5175. At this time, the control unit 5177 recognizes various objects in the image of the surgical site using various image recognition technologies. For example, the control unit 5177 can recognize surgical tools such as forceps, specific biological parts, bleeding, mist when using the energy treatment tool 5135, and the like by detecting the shape, color, and the like of the edge of the object included in the image of the surgical site. When displaying the image of the surgical site on the display device 5155, the control unit 5177 superimposes and displays various surgery support information on the image of the surgical site using the recognition result. By superimposing and displaying the surgery support information and presenting it to the operator 5181, it is possible to proceed with the surgery more safely and reliably.

The transmission cable 5179 that connects the camera head 5119 and the CCU 5153 is an electric signal cable supporting electric signal communication, an optical fiber supporting optical communication, or a composite cable thereof.

Here, while communication is performed by wire using the transmission cable 5179 in the example shown in FIG. 27, communication between the camera head 5119 and the CCU 5153 may be performed wirelessly. In a case where the communication between the camera head 5119 and the CCU 5153 is performed wirelessly, it is not necessary to lay the transmission cable 5179 in the operating room. Hence, a situation in which the transmission cable 5179 hinders the movement of the medical staff in the operating room can be solved.

An example of the operating room system 5100 to which the technology according to the present disclosure can be applied has been described above. Note that while the case where the medical system to which the operating room system 5100 is applied is the endoscopic surgery system 5113 has been described here as an example, the configuration of the operating room system 5100 is not limited to such an example. For example, the operating room system 5100 may be applied to an examination flexible endoscopic system or a microsurgery system instead of the endoscopic surgery system 5113.

Among the above-described configurations, the technology according to the present disclosure can be applied to the control unit 5177. By applying the technology according to the present disclosure to the control unit 5177, it is possible to recognize minute blood vessels and minute bleeding points in the surgical site included in the image of the surgical site. When displaying the image of the surgical site on the display device 5155, the control unit 5177 superimposes and displays various surgery support information on the image of the surgical site using the recognition result. By superimposing and displaying the surgery support information and presenting it to the operator 5181, it is possible to proceed with the surgery more safely and reliably.

(Application to Mobile Control System)

The technology according to the present disclosure may be implemented as a device mounted on any type of movable bodies including a car, an electric car, a hybrid electric car, a motorcycle, a bicycle, a personal mobility, an airplane, a drone, a ship, a robot, a construction machine, an agricultural machine (tractor), and the like.

Figure 28:
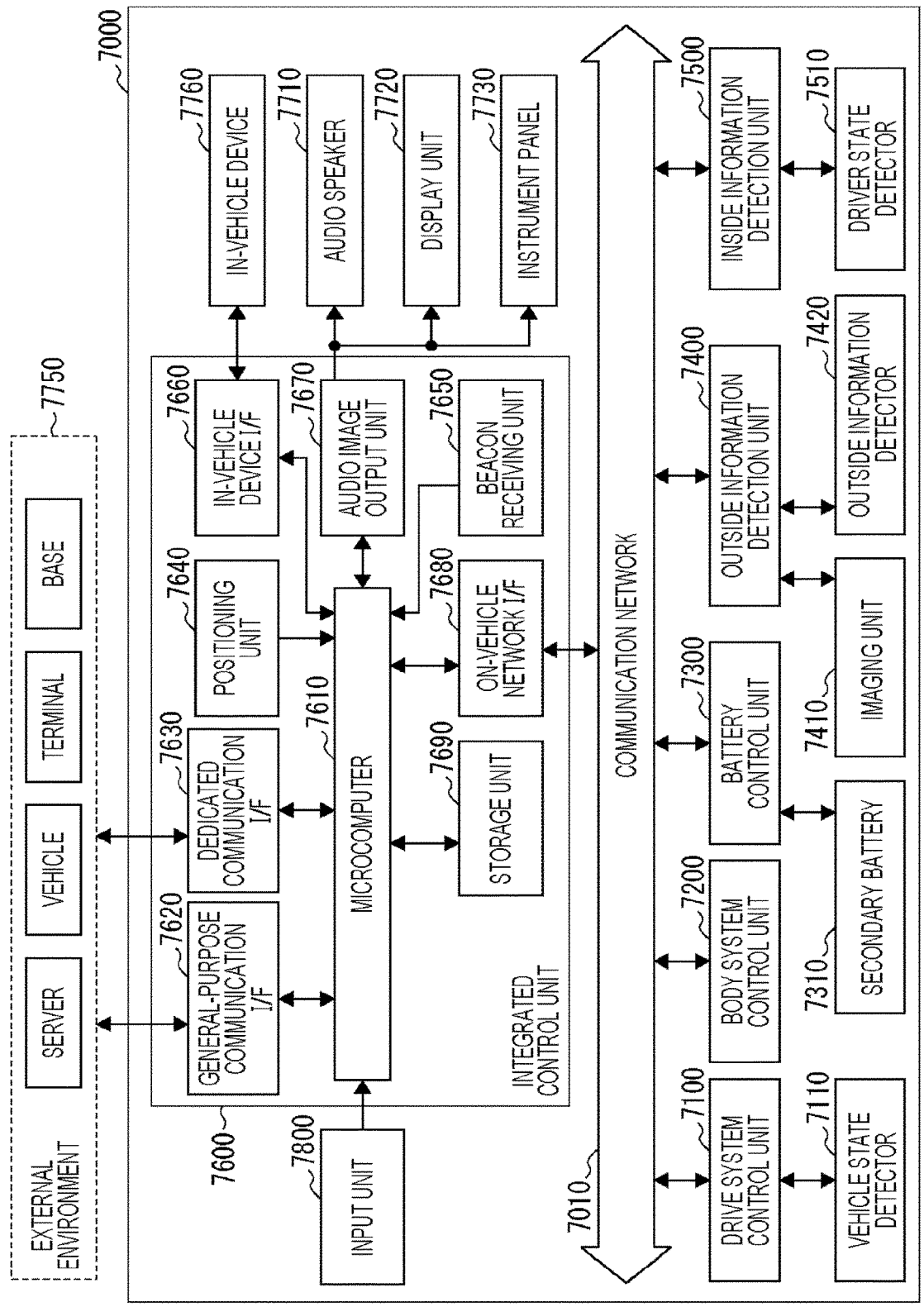
FIG. 28 is a block diagram showing an example of a schematic configuration of a vehicle control system.

FIG. 28 is a block diagram showing a schematic configuration example of a vehicle control system 7000 which is an example of a mobile control system to which the technology according to the present disclosure can be applied. The vehicle control system 7000 includes multiple electronic control units connected through a communication network 7010. In the example shown in FIG. 28, the vehicle control system 7000 includes a drive system control unit 7100, a body system control unit 7200, a battery control unit 7300, an outside information detection unit 7400, an inside information detection unit 7500, and an integrated control unit 7600. The communication network 7010 connecting the multiple control units may be an on-vehicle communication network compliant with an arbitrary standard such as controller area network (CAN), local interconnect network (LIN), local area network (LAN), and FlexRay®, for example.

Each control unit includes a microcomputer that performs arithmetic processing according to various programs, a storage unit that stores a program executed by the microcomputer or parameters used for various arithmetic operations, and a drive circuit that drives various devices to be controlled. Each control unit includes a network I/F for communicating with other control units through the communication network 7010, and a communication I/F for communicating with devices, sensors, or the like inside or outside the vehicle by wired communication or wireless communication. In FIG. 28, as the functional configuration of the integrated control unit 7600, a microcomputer 7610, a general-purpose communication I/F 7620, a dedicated communication I/F 7630, a positioning unit 7640, a beacon receiving unit 7650, an in-vehicle device I/F 7660, an audio image output unit 7670, an in-vehicle network I/F 7680, and a storage unit 7690 are illustrated. The other control units similarly include a microcomputer, a communication I/F, a storage unit, and the like.

The drive system control unit 7100 controls the operation of devices related to the drive system of the vehicle according to various programs. For example, the drive system control unit 7100 functions as a controller of a drive force generation device for generating a drive force of a vehicle such as an internal combustion engine or a drive motor, a drive force transmission mechanism for transmitting the drive force to wheels, a steering mechanism that adjusts the steering angle of the vehicle, a braking device that generates a braking force of the vehicle, and the like. The drive system control unit 7100 may have a function as a controller such as an antilock brake system (ABS) or an electronic stability control (ESC).

A vehicle state detector 7110 is connected to the drive system control unit 7100. The vehicle state detector 7110 includes, for example, at least one of a gyro sensor that detects the angular velocity of the shaft rotational movement of the vehicle body, an acceleration sensor that detects the acceleration of the vehicle, or a sensor for detecting an accelerator pedal operation amount, a brake pedal operation amount, a steering wheel steering angle, an engine speed, a wheel rotation speed, or the like. The drive system control unit 7100 performs arithmetic processing using a signal input from the vehicle state detector 7110 to control an internal combustion engine, a drive motor, an electric power steering device, a brake device, or the like.

The body system control unit 7200 controls the operation of various devices equipped on the vehicle body according to various programs. For example, the body system control unit 7200 functions as a controller of a keyless entry system, a smart key system, a power window device, or various lamps such as a headlamp, a back lamp, a brake lamp, a blinker, or a fog lamp. In this case, the body system control unit 7200 may receive input of radio waves transmitted from a portable device substituting for a key or signals of various switches. The body system control unit 7200 receives input of these radio waves or signals, and controls a door lock device, a power window device, a lamp, and the like of the vehicle.

The battery control unit 7300 controls a secondary battery 7310 that is the power supply source of the drive motor according to various programs. For example, the battery control unit 7300 receives input of information such as the battery temperature, the battery output voltage, or the remaining capacity of the battery from a battery device including the secondary battery 7310. The battery control unit 7300 performs arithmetic processing using these signals to control the temperature adjustment of the secondary battery 7310 or control a cooling device or the like provided in the battery device.

The outside information detection unit 7400 detects information outside the vehicle equipped with the vehicle control system 7000. For example, at least one of an imaging unit 7410 or an outside information detector 7420 is connected to the outside information detection unit 7400. The imaging unit 7410 includes at least one of a time of flight (ToF) camera, a stereo camera, a monocular camera, an infrared camera, or other cameras. The outside information detector 7420 includes at least one of an environment sensor for detecting the current weather, or an ambient information detection sensor for detecting another vehicle, an obstacle, a pedestrian, or the like around the vehicle equipped with the vehicle control system 7000, for example.

The environment sensor may be at least one of a raindrop sensor that detects rainy weather, a fog sensor that detects fog, a sunshine sensor that detects the degree of sunshine, or a snow sensor that detects snowfall, for example. The ambient information detection sensor may be at least one of an ultrasonic sensor, a radar device, or a light detection and ranging or laser imaging detection and ranging (LIDAR) device. The imaging unit 7410 and the outside information detector 7420 may be provided as independent sensors or devices, or may be provided as a device in which multiple sensors or devices are integrated.

Figure 29:
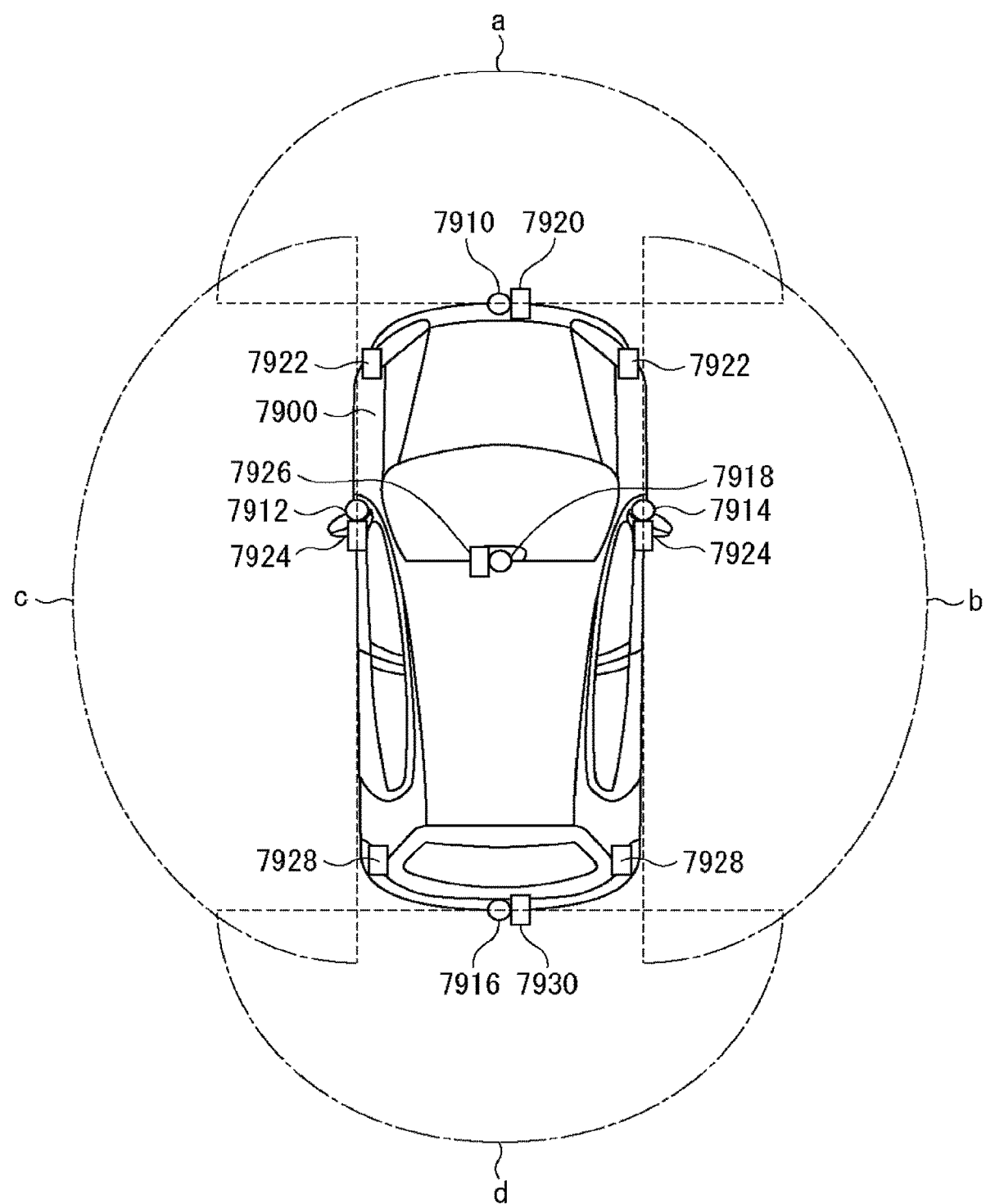
FIG. 29 is an explanatory diagram showing an example of installation positions of an outside information detection unit and an imaging unit.

Here, FIG. 29 shows an example of the installation positions of the imaging unit 7410 and the outside information detector 7420. For example, imaging units 7910, 7912, 7914, 7916, and 7918 are provided in at least one of positions of a front nose, a side mirror, a rear bumper, a back door, or an upper portion of a windshield in the vehicle interior of a vehicle 7900. The imaging unit 7910 provided on the front nose and the imaging unit 7918 provided on the upper portion of the windshield in the vehicle interior mainly acquire images of the front of the vehicle 7900. The imaging units 7912 and 7914 provided on the side mirrors mainly acquire images of the sides of the vehicle 7900. The imaging unit 7916 provided on the rear bumper or the back door mainly acquires an image of the rear of the vehicle 7900. The imaging unit 7918 provided on the upper portion of the windshield in the vehicle interior is mainly used to detect a preceding vehicle, or a pedestrian, an obstacle, a traffic light, a traffic sign, a lane, or the like.

Note that FIG. 29 shows an example of the imaging ranges of the imaging units 7910, 7912, 7914, and 7916. An imaging range a indicates the imaging range of the imaging unit 7910 provided on the front nose, imaging ranges b and c indicate the imaging ranges of the imaging units 7912 and 7914 provided on the side mirrors, respectively, and an imaging range d indicates the imaging range of the imaging unit 7916 provided on the rear bumper or the back door. For example, by superimposing the pieces of image data captured by the imaging units 7910, 7912, 7914, and 7916, a bird's eye view image of the vehicle 7900 as viewed from above can be obtained.

Outside information detection parts 7920, 7922, 7924, 7926, 7928, and 7930 provided on the front, rear, sides, corners, and the upper portion of the windshield in the vehicle interior of the vehicle 7900 may be ultrasonic sensors or radar devices, for example. The outside information detection parts 7920, 7926, and 7930 provided on the front nose, the rear bumper, the back door, and the upper portion of the windshield in the vehicle interior of the vehicle 7900 may be LIDAR devices, for example. These outside information detection parts 7920 to 7930 are mainly used for detecting a preceding vehicle, a pedestrian, an obstacle, or the like.

Returning to FIG. 28, the description will be continued. The outside information detection unit 7400 causes the imaging unit 7410 to capture an image of the outside of the vehicle, and receives the captured image data. Additionally, the outside information detection unit 7400 also receives detection information from the outside information detector 7420 connected thereto. In a case where the outside information detector 7420 is an ultrasonic sensor, a radar device, or a LIDAR device, the outside information detection unit 7400 causes transmission of ultrasonic waves, electromagnetic waves, or the like, and receives information on the received reflected waves. The outside information detection unit 7400 may perform object detection processing or distance detection processing of a person, a vehicle, an obstacle, a sign, characters on a road surface, or the like on the basis of the received information. The outside information detection unit 7400 may perform environment recognition processing for recognizing rainfall, fog, road surface conditions, or the like on the basis of the received information. The outside information detection unit 7400 may calculate the distance to the object outside the vehicle on the basis of the received information.

Additionally, the outside information detection unit 7400 may perform image recognition processing or distance detection processing of recognizing a person, a vehicle, an obstacle, a sign, characters on a road surface, or the like on the basis of the received image data. The outside information detection unit 7400 may perform processing such as distortion correction or position adjustment on the received image data, combine pieces of image data captured by different imaging units 7410, and generate a bird's eye view image or a panoramic image. The outside information detection unit 7400 may perform viewpoint conversion processing using pieces of image data captured by different imaging units 7410.

The inside information detection unit 7500 detects information inside the vehicle. For example, a driver state detector 7510 that detects a state of a driver is connected to the inside information detection unit 7500. The driver state detector 7510 may include a camera that images the driver, a biometric sensor that detects biometric information of the driver, a microphone that collects voice in the vehicle interior, and the like. For example, the biometric sensor is provided on a seat surface, a steering wheel, or the like, and detects biometric information of an occupant sitting in a seat or a driver who grips the steering wheel. The inside information detection unit 7500 may calculate the degree of fatigue or concentration of the driver or determine whether or not the driver is asleep, on the basis of detection information input from the driver state detector 7510. The inside information detection unit 7500 may perform processing such as noise canceling processing on the collected audio signal.

The integrated control unit 7600 controls overall operations in the vehicle control system 7000 according to various programs. An input unit 7800 is connected to the integrated control unit 7600. The input unit 7800 is implemented by a device such as a touch panel, a button, a microphone, a switch, or a lever on which an occupant can perform input operation, for example. The integrated control unit 7600 may receive input of data obtained by voice recognition of voice input by a microphone. The input unit 7800 may be a remote control device using infrared rays or other radio waves, or an external connection device such as a mobile phone or a personal digital assistant (PDA) compatible with the operation of the vehicle control system 7000, for example. The input unit 7800 may be a camera, for example, in which case the occupant can input information by gesture. Alternatively, data obtained by detecting the movement of a wearable device worn by the occupant may be input. Moreover, the input unit 7800 may include an input control circuit or the like that generates an input signal on the basis of information input by the occupant or the like using the above input unit 7800, and outputs the input signal to the integrated control unit 7600, for example. By operating the input unit 7800, the occupant or the like inputs various data or gives an instruction on a processing operation to the vehicle control system 7000.

The storage unit 7690 may include a read only memory (ROM) that stores various programs executed by the microcomputer, and a random access memory (RAM) that stores various parameters, calculation results, sensor values, or the like. Additionally, the storage unit 7690 may be implemented by a magnetic storage device such as a hard disc drive (HDD), a semiconductor storage device, an optical storage device, a magneto-optical storage device, or the like.

The general-purpose communication I/F 7620 is a general-purpose communication I/F that mediates communication with various devices existing in an external environment 7750. The general-purpose communication I/F 7620 may implement a cellular communication protocol such as global system of mobile communications (GSM)®, WiMAX®, long term evolution (LTE)®, or LTE-advanced (LTE-A), or another wireless communication protocol such as wireless LAN (also referred to as Wi-Fi®) or Bluetooth®. For example, the general-purpose communication I/F 7620 may connect to a device (e.g., application server or control server) existing in an external network (e.g., Internet, cloud network, or network unique to business operator) through a base station or an access point. Additionally, for example, the general-purpose communication I/F 7620 may connect with a terminal (e.g., terminal of driver, pedestrian, or store, or machine type communication (MTC) terminal) existing in the vicinity of the vehicle by using the peer to peer (P2P) technology.

The dedicated communication I/F 7630 is a communication I/F that supports a communication protocol designed for use in a vehicle. The dedicated communication I/F 7630 may implement wireless access in vehicle environment (WAVE), which is a combination of the lower layer IEEE802.11p and the upper layer IEEE1609, dedicated short range communications (DSRC), or a standard protocol such as a cellular communication protocol, for example. The dedicated communication I/F 7630 performs V2X communication, which is a concept that typically includes one or more of vehicle to vehicle communication, vehicle to infrastructure communication, vehicle to home communication, and vehicle to pedestrian communication.

For example, the positioning unit 7640 receives a global navigation satellite system (GNSS) signal from a GNSS satellite (e.g., global positioning system (GPS) signal from GPS satellite) to perform positioning and generate position information including the latitude, longitude, and altitude of the vehicle. Note that the positioning unit 7640 may specify the current position by exchanging signals with a wireless access point, or may acquire position information from a terminal such as a mobile phone, a PHS, or a smartphone having a positioning function.

The beacon receiving unit 7650 receives radio waves or electromagnetic waves transmitted from a radio station or the like installed on the road, and acquires information such as current location, traffic congestion, traffic restrictions, or required time, for example. Note that the function of the beacon receiving unit 7650 may be included in the dedicated communication I/F 7630 described above.

The in-vehicle device I/F 7660 is a communication interface that mediates connection between the microcomputer 7610 and various in-vehicle devices 7760 existing in the vehicle. The in-vehicle device I/F 7660 may establish a wireless connection using a wireless LAN, Bluetooth®, or a wireless communication protocol such as near field communication (NFC) or Wireless USB (WUSB). Additionally, the in-vehicle device I/F 7660 may establish a wired connection such as universal serial bus (USB), high-definition multimedia interface (HDMI)®, mobile high-definition link (MHL), or the like through a connection terminal (and, if necessary, a cable) not shown. The in-vehicle device 7760 may include at least one of a mobile device or a wearable device that an occupant owns, or an information device that is carried in or attached to the vehicle, for example. Additionally, the in-vehicle device 7760 may include a navigation device that searches for a route to an arbitrary destination. The in-vehicle device I/F 7660 exchanges control signals or data signals with these in-vehicle devices 7760.

The in-vehicle network I/F 7680 is an interface that mediates communication between the microcomputer 7610 and the communication network 7010. The in-vehicle network I/F 7680 transmits and receives signals and the like according to a predetermined protocol supported by the communication network 7010.

The microcomputer 7610 of the integrated control unit 7600 controls the vehicle control system 7000 according to various programs, on the basis of information acquired through at least one of the general-purpose communication I/F 7620, the dedicated communication I/F 7630, the positioning unit 7640, the beacon receiving unit 7650, the in-vehicle device I/F 7660, or the in-vehicle network I/F 7680. For example, the microcomputer 7610 may calculate a control target value of the drive force generation device, the steering mechanism, or the braking device on the basis of acquired information on the inside and outside of the vehicle, and output a control command to the drive system control unit 7100. For example, the microcomputer 7610 can perform coordinated control aimed to achieve functions of an advanced driver assistance system (ADAS) including collision avoidance or shock mitigation of a vehicle, follow-up traveling based on an inter-vehicle distance, vehicle speed maintenance traveling, vehicle collision warning, vehicle lane departure warning, or the like. Additionally, the microcomputer 7610 may control the drive force generation device, the steering mechanism, the braking device, or the like on the basis of acquired information on the surrounding of the vehicle, to perform coordinated control aimed for automatic driving of traveling autonomously without depending on the driver's operation, for example.

The microcomputer 7610 may generate, on the basis of information acquired through at least one of the general-purpose communication I/F 7620, the dedicated communication I/F 7630, the positioning unit 7640, the beacon receiving unit 7650, the in-vehicle device I/F 7660, or the in-vehicle network I/F 7680, three-dimensional distance information between the vehicle and surrounding objects such as structures and persons, and create local map information including peripheral information of the current position of the vehicle. Additionally, the microcomputer 7610 may predict a risk of a vehicle collision, proximity of a pedestrian or the like, entry into a closed road, or the like on the basis of the acquired information, and generate a warning signal. The warning signal may be a signal for sounding a warning sound or lighting a warning lamp, for example.

The audio image output unit 7670 transmits an output signal of at least one of audio or an image to an output device capable of visually or aurally giving notification of information to an occupant or to the outside of the vehicle. In the example of FIG. 28, an audio speaker 7710, a display unit 7720, and an instrument panel 7730 are shown as examples of the output device. The display unit 7720 may include at least one of an onboard display or a head-up display, for example. The display unit 7720 may have an augmented reality (AR) display function. The output device may be a device other than these devices, such as headphones, a wearable device such as a glasses-type display worn by an occupant, a projector, or a lamp. In a case where the output device is a display device, the display device visually displays results obtained by various processing performed by the microcomputer 7610 or information received from another control unit in various formats such as text, images, tables, and graphs. Additionally, in a case where the output device is a voice output device, the voice output device converts an audio signal including reproduced voice data, acoustic data, or the like into an analog signal and outputs the analog signal in an auditory manner.

Note that in the example shown in FIG. 28, at least two control units connected through the communication network 7010 may be integrated as one control unit. Alternatively, each control unit may include multiple control units. Moreover, the vehicle control system 7000 may include another control unit not shown. Additionally, in the above description, some or all of the functions of any control unit may be given to another control unit. That is, as long as information is transmitted and received through the communication network 7010, the predetermined arithmetic processing may be performed by any control unit. Similarly, a sensor or device connected to one of the control units may be connected to another control unit, and multiple control units may transmit and receive detection information to and from each other through the communication network 7010.

Among the above-described configurations, the technology according to the present disclosure can be applied to the outside information detection unit 7400. By applying the technology according to the present disclosure to the outside information detection unit 7400, it is possible to recognize a distant person, vehicle, obstacle, sign, characters on a road surface, or the like included an outside image captured outside the vehicle. When displaying the outside image on the display unit 7720, the outside information detection unit 7400 uses the recognition result to superimpose and display various driving support information on the outside image. By superimposing and displaying the driving support information and presenting it to the driver, it is possible to grasp road conditions and the like in advance and prevent accidents in advance.

The embodiment of the technology according to the present disclosure is not limited to the above-described embodiments, and various modifications can be made without departing from the scope of the technology of the present disclosure.

Additionally, the effect described in the present specification is merely an illustration and is not restrictive. Hence, other effects can be obtained.

Moreover, the technology according to the present disclosure can have the following configurations.

(1)

An image processing device including:
 a first acquisition unit that acquires, from a first resolution image, a second resolution image having a lower resolution than the first resolution image;
 a classification unit that classifies an object included in the second resolution image;
 an identification unit that identifies an object area corresponding to the object of a predetermined classification in the first resolution image; and
 a recognition unit that performs recognition processing of the object on the object area identified in the first resolution image.

(2)

The image processing device according to (1) further including
 an extraction unit that extracts a moving object in the second resolution image, in which
 the classification unit classifies the extracted moving object.

(3)

The image processing device according to (2), in which
 the extraction unit extracts the moving object by background subtraction.

(4)

The image processing device according to (2) or (3), in which
 the classification unit classifies the moving object on the basis of the size of the extracted moving object.

(5)

The image processing device according to (4), in which
 the classification unit classifies the moving objects by setting multiple image frames smaller than a predetermined size for the moving objects extracted in the second resolution image.

(6)

The image processing device according to (5), in which
 the classification unit switches the size of the image frame to be set, according to the size of a contour rectangle in which a contour of the extracted moving object fits.

(7)

The image processing device according to (5) or (6), in which
 the identification unit identifies the object area by converting coordinates of the image frame set in the second resolution image into coordinates on the first resolution image.

(8)

The image processing device according to any one of (2) to (7) further including:
 a tracking processing unit that tracks the moving object recognized in the first resolution image; and
 a first deduplication processing unit that eliminates duplication in the tracked moving object and the identified object area in the first resolution image.

(9)

The image processing device according to (8), in which
 the tracking processing unit corrects a position of the moving object to be tracked every predetermined frame.

(10)

The image processing device according to (9), in which
 the recognition unit performs recognition processing of the object by normalizing the size of the identified object area on the basis of the size of teacher data used for the recognition processing of the object.

(11)

The image processing device according to (10) further including:
 a second acquisition unit that acquires, from the second resolution image, a third resolution image having a lower resolution than the second resolution image; and
 an object detection unit that performs object detection on the third resolution image.

(12)
 The image processing device according to (11) further including
  a second deduplication processing unit that eliminates duplication in the moving object recognized in the first resolution image and an object detected by the object detection unit.
(13)
 The image processing device according to any one of (4) to (12), in which
  the classification unit further classifies the moving object on the basis of a position of the extracted moving object.
(14)
 The image processing device according to any one of (4) to (13), in which
  the classification unit further classifies the moving object on the basis of a speed of movement of the extracted moving object.
(15)
 The image processing device according to any one of (1) to (14), in which
  the recognition unit performs recognition processing of the object by performing binary classification on the object area.
(16)
 The image processing device according to any one of (1) to (14), in which
  the recognition unit performs recognition processing of the object by performing multiclass classification on the object area.
(17)
 The image processing device according to any one of (1) to (16) further including
  a high-resolution processing unit that increases the resolution of the first resolution image, in which
  the first acquisition unit acquires the second resolution image from the higher-resolution first resolution image.
(18)
 The image processing device according to any one of (1) to (17), in which
  the first acquisition unit, the classification unit, the identification unit, and the recognition unit repeat processing every predetermined frame.
(19)
 An image processing method by an image processing device, the method including:
  acquiring, from a first resolution image, a second resolution image having a lower resolution than the first resolution image;
  classifying an object included in the second resolution image;
  identifying an object area corresponding to the object of a predetermined classification in the first resolution image; and
  performing recognition processing of the object on the object area identified in the first resolution image.
(20)
 A program that causes a computer to perform processing including:
  acquiring, from a first resolution image, a second resolution image having a lower resolution than the first resolution image;
  classifying an object included in the second resolution image;
  identifying an object area corresponding to the object of a predetermined classification in the first resolution image; and
  performing recognition processing of the object on the object area identified in the first resolution image.

REFERENCE SIGNS LIST

10 Image processing device
31 Tracking processing unit
32 Medium-resolution image acquisition unit
33 Object extraction unit
34 Classification unit
35 Identification unit
36 Deduplication processing unit
37 Recognition unit
38 Filter processing unit
39 Low-resolution image acquisition unit
40 Object detection unit
41 Filter processing unit
42 Deduplication processing

The invention claimed is:

1. An image processing device, comprising:
 circuitry configured to
  acquire, by processing pixels of a first resolution image, a second resolution image having a lower resolution than the first resolution image;
  extract and classify an object from the acquired second resolution image;
  identify, in the first resolution image based on a position of the extracted object within the acquired second resolution image, an object area corresponding to the object extracted from the second resolution image, the extracted object having a predetermined classification; and
  perform recognition processing of the object in the object area identified in the first resolution image.

2. The image processing device according to claim 1, wherein the circuitry is further configured to
 extract a moving object in the second resolution image, and
 classify the extracted moving object.

3. The image processing device according to claim 2, wherein the processing circuitry is further configured to extract the moving object by background subtraction.

4. The image processing device according to claim 2, wherein the circuitry is further configured to classify the moving object based on a size of the extracted moving object.

5. The image processing device according to claim 4, wherein the circuitry is further configured to classify the moving objects by setting a plurality of image frames smaller than a predetermined size for the moving objects extracted in the second resolution image.

6. The image processing device according to claim 5, wherein the circuitry is further configured to switch a size of the image frame to be set, according to a size of a contour rectangle in which a contour of the extracted moving object fits.

7. The image processing device according to claim 6, wherein the circuitry is further configured to identify the object area by converting coordinates of the image frame set in the second resolution image into coordinates on the first resolution image.

8. The image processing device according to claim 7, wherein the circuitry is further configured to:

track the moving object recognized in the first resolution image; and eliminate duplication in the tracked moving object and the identified object area in the first resolution image.

9. The image processing device according to claim 8, wherein the circuitry is further configured to correct a position of the moving object to be tracked every predetermined frame.

10. The image processing device according to claim 9, wherein the circuitry is further configured to perform recognition processing of the object by normalizing a size of the identified object area based on a size of teacher data used for the recognition processing of the object.

11. The image processing device according to claim 10, wherein the circuitry is further configured to:

acquire, from the second resolution image, a third resolution image having a lower resolution than the second resolution image; and perform object detection on the third resolution image.

12. The image processing device according to claim 11, wherein the circuitry is further configured to eliminate duplication in the moving object recognized in the first resolution image and an object detected by the circuitry.

13. The image processing device according to claim 4, wherein the circuitry is further configured to classify the moving object based on a position of the extracted moving object.

14. The image processing device according to claim 4, wherein the circuitry is further configured to classify the moving object based on a speed of movement of the extracted moving object.

15. The image processing device according to claim 1, wherein the circuitry is further configured to perform recognition processing of the object by performing binary classification on the object area.

16. The image processing device according to claim 1, wherein the circuitry is further configured to perform recognition processing of the object by performing multiclass classification on the object area.

17. The image processing device according to claim 1, wherein the circuitry is further configured to:

increase a resolution of the first resolution image, and acquire the second resolution image from the higher-resolution first resolution image.

18. The image processing device according to claim 1, wherein the circuitry is further configured to repeat the acquiring, classifying, identifying, and recognition processing every predetermined frame.

19. An image processing method by an image processing device, the method comprising:

acquiring, by processing pixels of a first resolution image, a second resolution image having a lower resolution than the first resolution image;

extracting and classifying an object from the acquired second resolution image;

identifying, in the first resolution image based on a position of the extracted object within the acquired second resolution image, an object area corresponding to the object extracted from the second resolution image, the extracted object having a predetermined classification; and performing recognition processing of the object on the object area identified in the first resolution image.

20. A non-transitory computer-readable medium storing a program that causes a computer to perform processing comprising:

acquiring, by processing pixels of a first resolution image, a second resolution image having a lower resolution than the first resolution image;

extracting and classifying an object from the acquired second resolution image;

identifying, in the first resolution image based on a position of the extracted object within the acquired second resolution image, an object area corresponding to the object extracted from the second resolution image, the extracted object having a predetermined classification; and performing recognition processing of the object on the object area identified in the first resolution image.

* * * * *